United States Patent [19]
Kasahara

[11] Patent Number: 5,745,466
[45] Date of Patent: Apr. 28, 1998

[54] OBJECTIVE LENS DRIVE APPARATUS FOR A RECORDING AND REPRODUCING DIFFERENT DISCS OF DIFFERENT FORMAT

[75] Inventor: Akihiro Kasahara, Chiba-ken, Japan

[73] Assignee: Kabushiki Kaisha Toshiba, Kawasaki, Japan

[21] Appl. No.: 576,139

[22] Filed: Dec. 22, 1995

[30] Foreign Application Priority Data

Dec. 26, 1994 [JP] Japan .................... 6-322067
Mar. 22, 1995 [JP] Japan .................... 7-062235
Aug. 22, 1995 [JP] Japan .................... 7-213513

[51] Int. Cl.$^6$ .................................... G11B 7/00
[52] U.S. Cl. ........................... 369/112; 369/118
[58] Field of Search .................. 369/58, 44.24, 369/112, 117, 118, 53, 54, 109, 110

[56] References Cited

U.S. PATENT DOCUMENTS

| | | | |
|---|---|---|---|
| 4,125,859 | 11/1978 | Oshida et al. | 369/117 X |
| 4,375,096 | 2/1983 | Gorog et al. | 369/117 X |
| 4,773,052 | 9/1988 | Sugiuma et al. | 369/44.29 X |
| 5,235,581 | 8/1993 | Miyagawa et al. | 369/112 X |
| 5,237,557 | 8/1993 | Kasahara . | |
| 5,281,797 | 1/1994 | Tatsuno et al. | 369/117 X |

FOREIGN PATENT DOCUMENTS

| | | |
|---|---|---|
| 0 465 175 | 1/1992 | European Pat. Off. . |
| 0 737 964 | 4/1996 | European Pat. Off. . |
| 0 731 457 | 9/1996 | European Pat. Off. . |
| 5-054406 | 3/1993 | Japan . |

OTHER PUBLICATIONS

Abstract; Hitoshi et al., Terasaki; patent; Feb. 25, 1994; 1p. only (JP6052549).
Abstract; Masamichi, Kondo; patent; Jan. 28, 1994; 1p. (JP6020298).

*Primary Examiner*—Paul W. Huber
*Attorney, Agent, or Firm*—Cushman, Darby & Cushman IP Group of Pillsbury, Madison & Sutro LLP

[57] ABSTRACT

The objective lens drive apparatus according to the present invention includes a movable member which can be moved along a surface of an optical information recording medium an objective lens installed on the movable member, for allowing a light beam to pass and for concentrating the beam onto an optical information recording medium, a first diaphragm member installed on the movable member, having a first opening for determining the diameter of the light beam passing, and a second diaphragm member such that the second diaphragm member can be excluded from or inserted into the light path of the light beam and has a second opening for determining the diameter of the light beam passing.

33 Claims, 21 Drawing Sheets

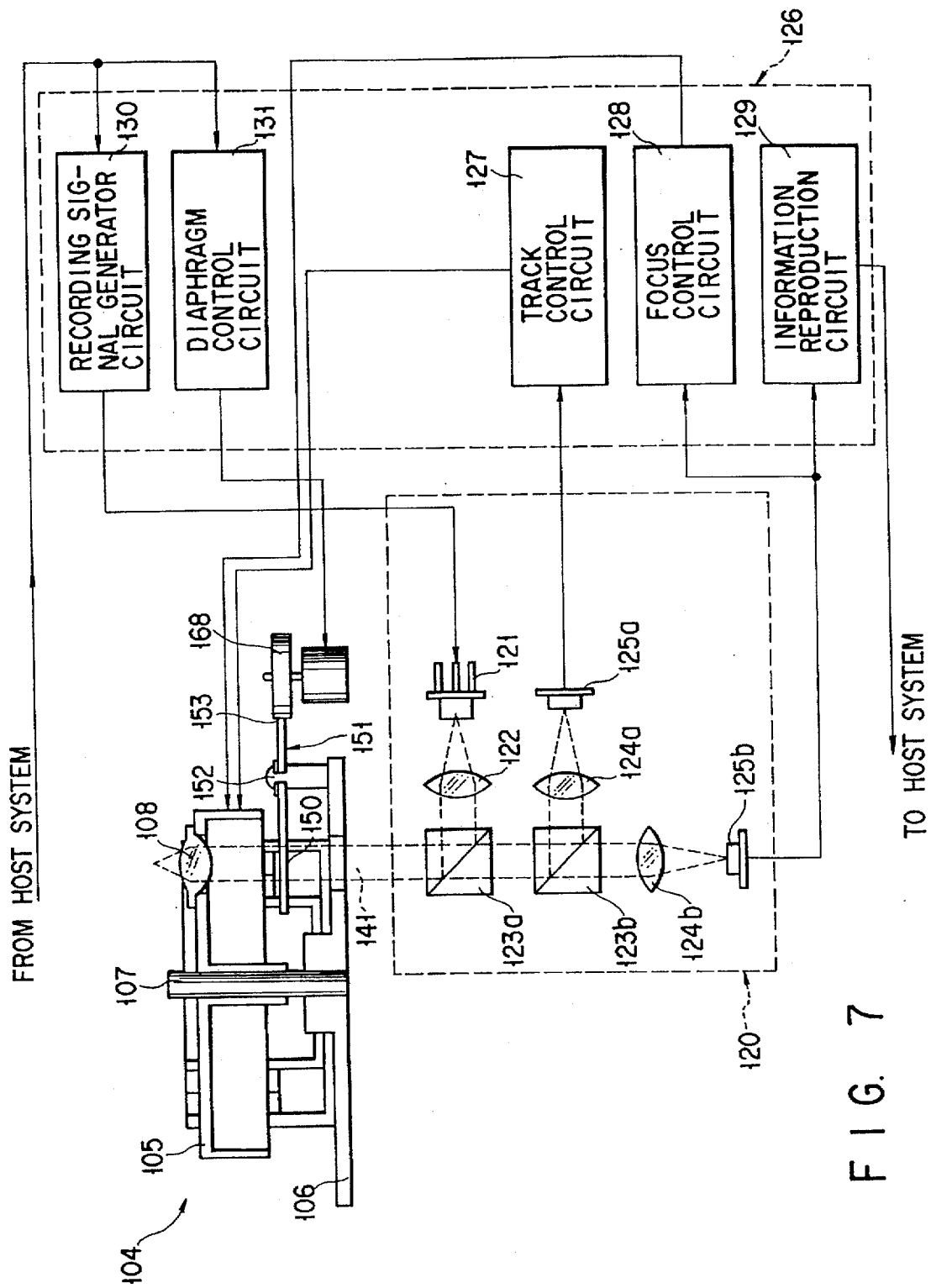
F I G. 7

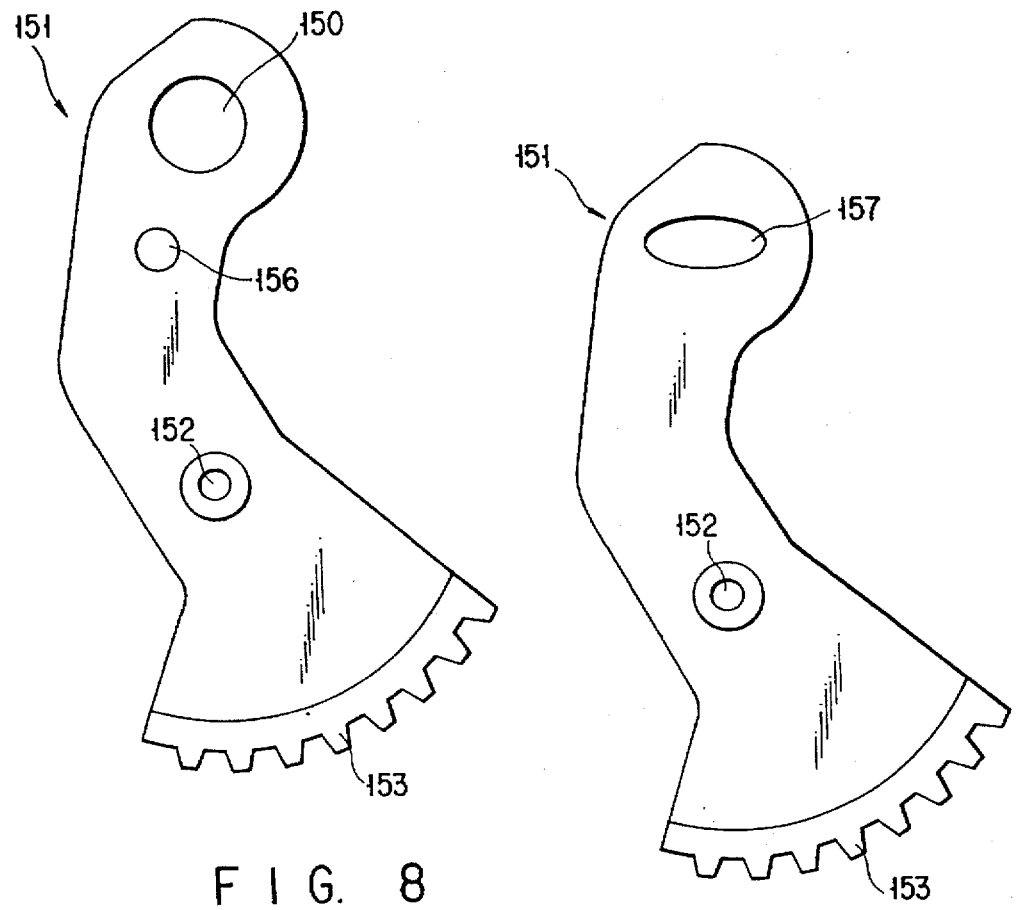
FIG. 8
FIG. 10
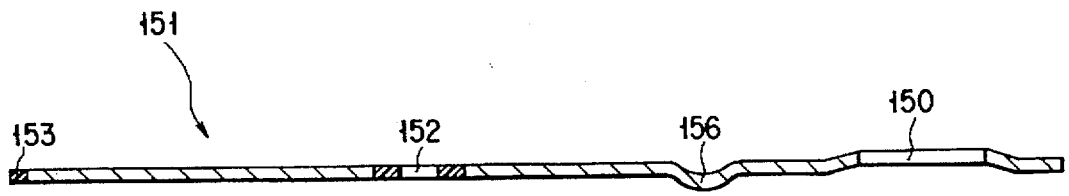
FIG. 9

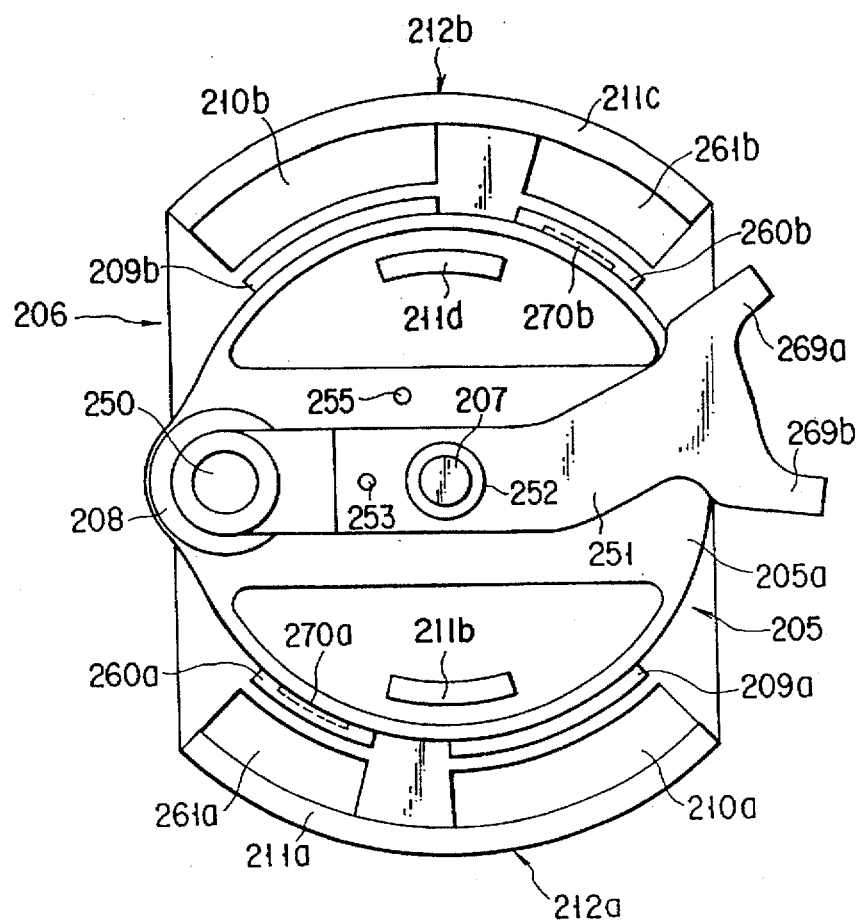
F I G. 12
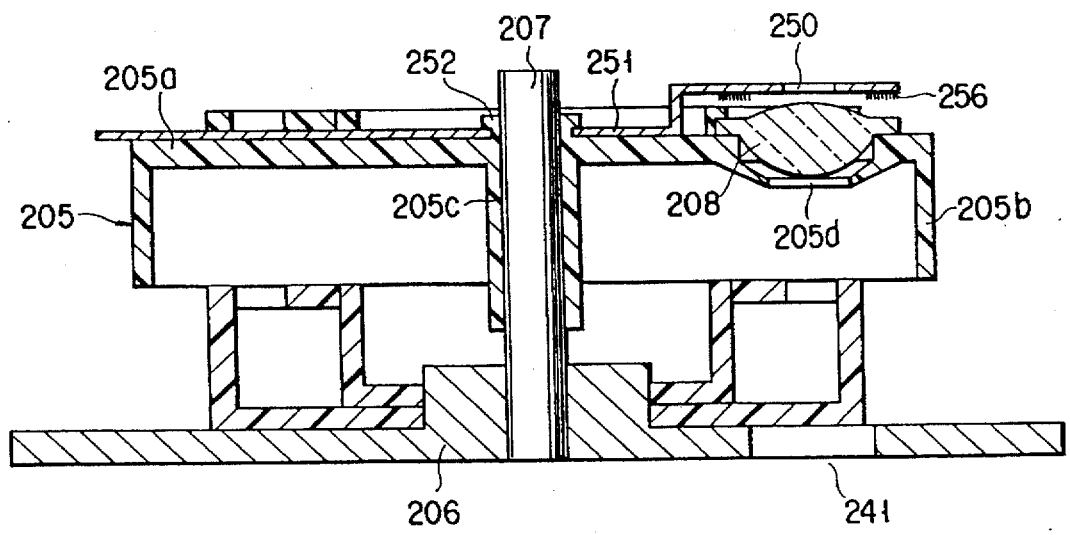
F I G. 13

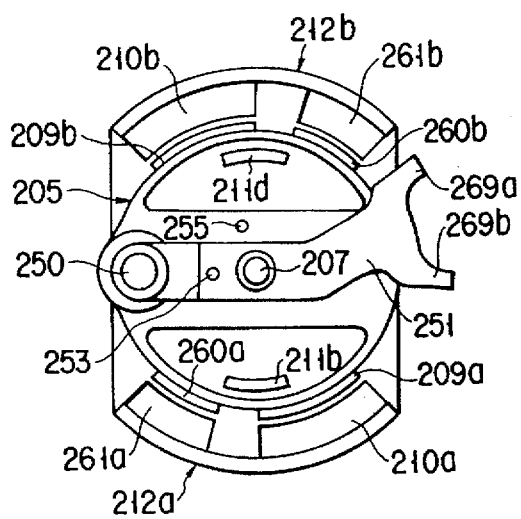
F I G. 15A
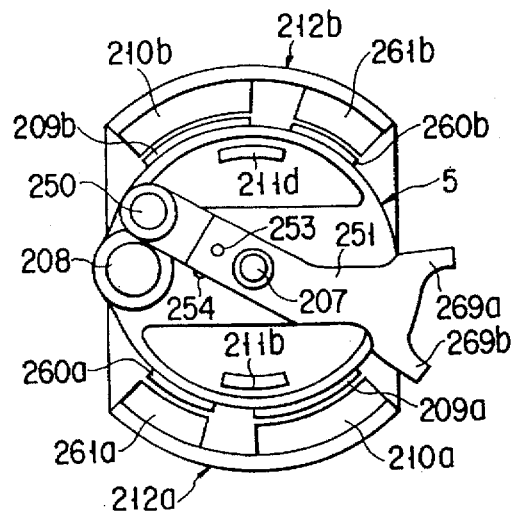
F I G. 15D
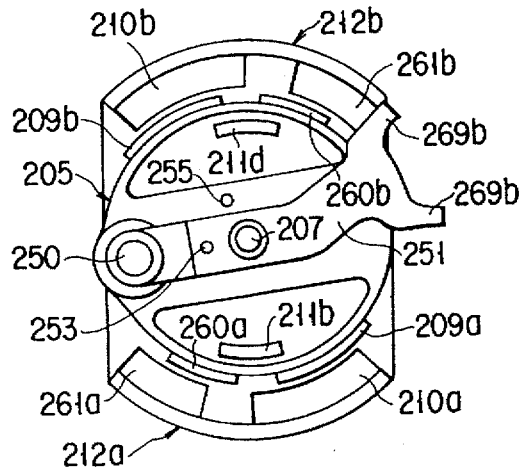
F I G. 15B
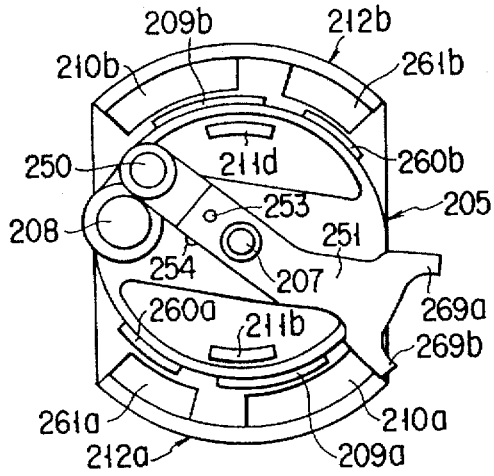
F I G. 15E
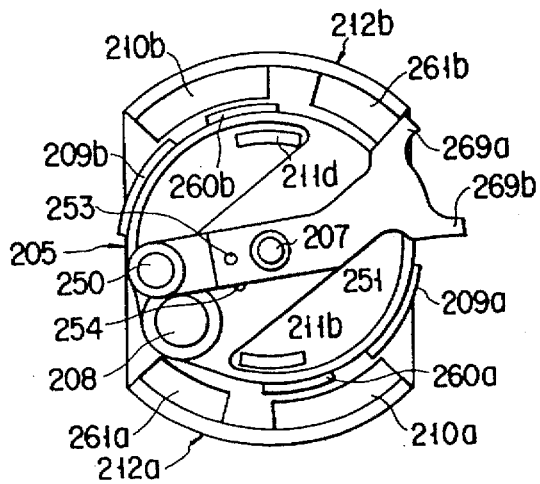
F I G. 15C
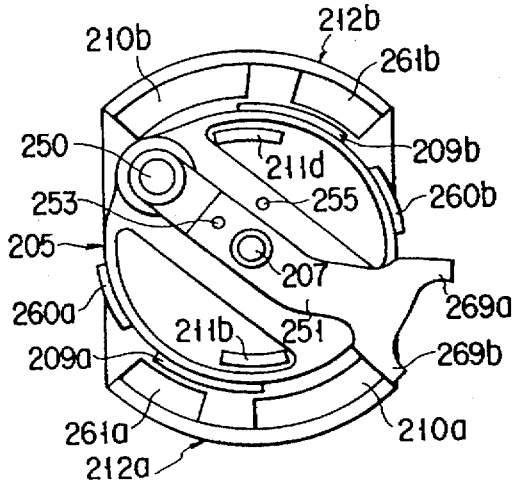
F I G. 15F

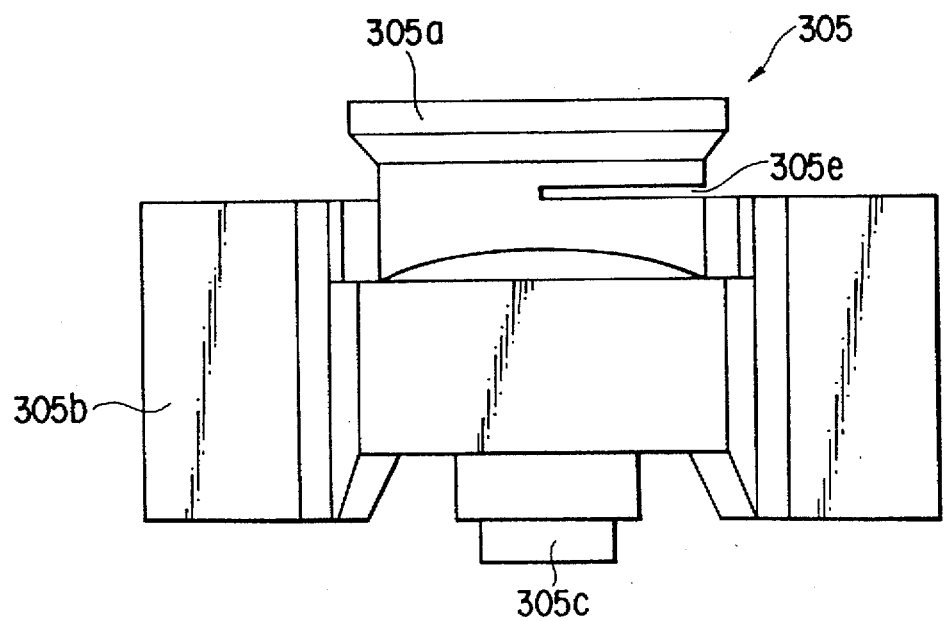
F I G. 24
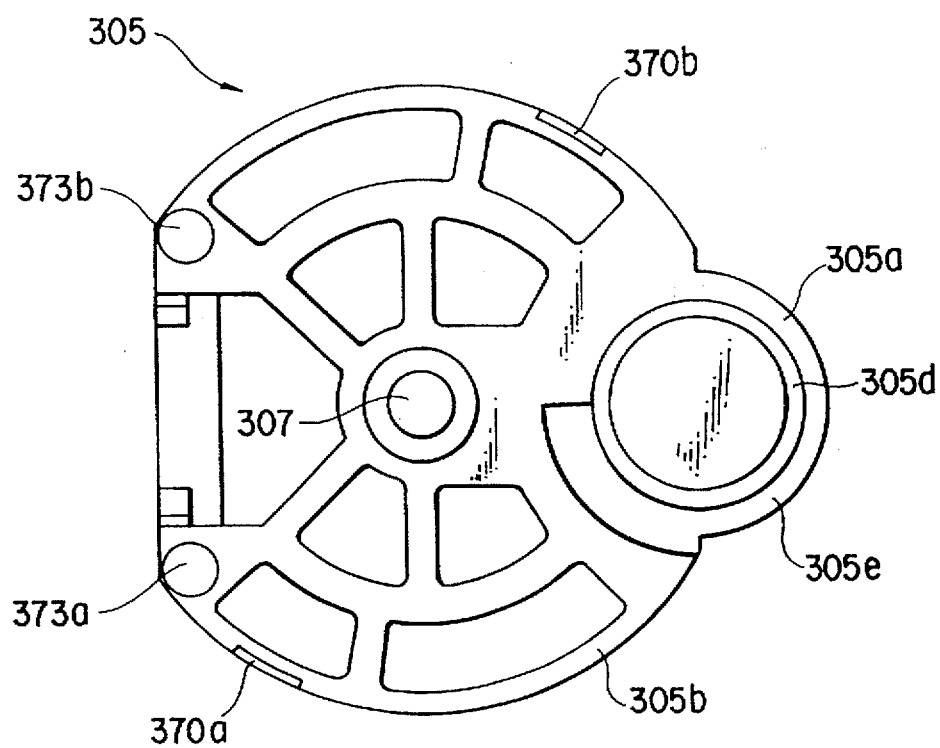
F I G. 25

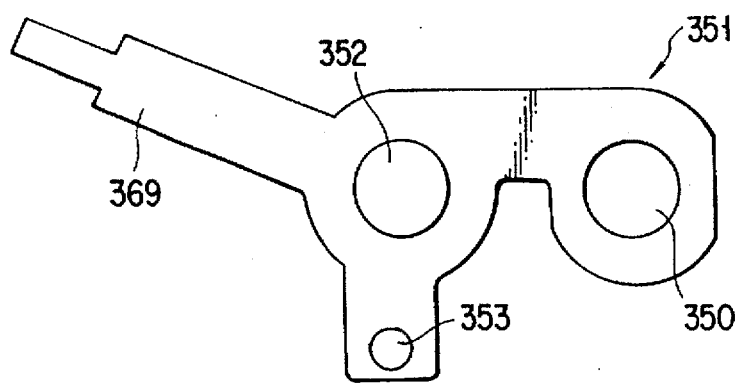
F I G. 26
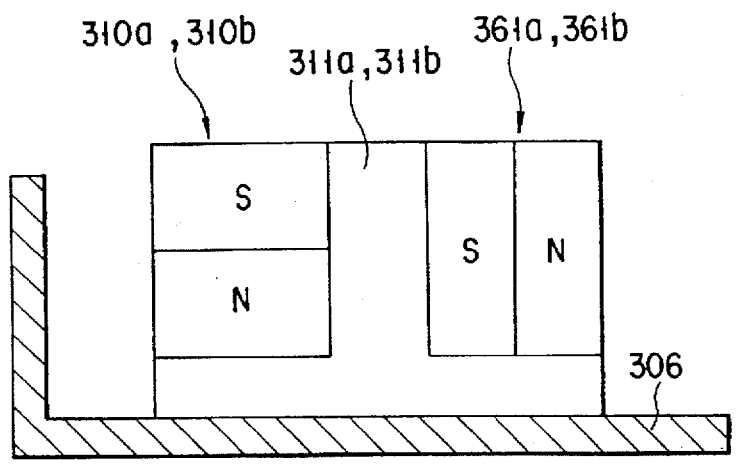
F I G. 27
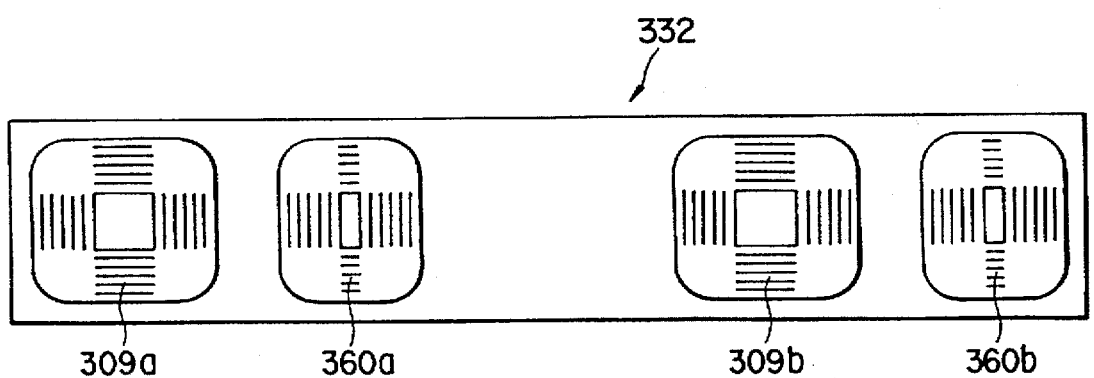
F I G. 28

OBJECTIVE LENS DRIVE APPARATUS FOR A RECORDING AND REPRODUCING DIFFERENT DISCS OF DIFFERENT FORMAT

BACKGROUND OF THE INVENTION

1. Field of the Invention

The present invention relates to an objective lens drive apparatus for recording and reproducing with respect to an optical information recording medium.

2. Description of the Related Art

In recent years, objective lens apparatuses which perform recording onto and reproducing from information recording media such as optical discs, magneto-optical discs and the like have been positively developed, as these optical information recording media have been developed. Objective lens drive apparatuses have already been broadly used as apparatuses for reproducing information from CD-ROMs as represented by compact discs (CDs), laser discs (LDs) and the like. In addition, an objective lens drive apparatus, not only as a reproducing apparatus, but also as a recording apparatus, has been recently developed. A MO (magneto-optical) method or a PC (phase-change) method is known as a recording method thereof.

In general, an optical disc and a magnet optical disc have recording structures defined by standards. However, it is expected that the recording density will be much more improved from now on and an optical disc of a new standard will appear. For example, it is highly possible that a bit width (i.e., a unit for which data is recorded) will be reduced to sub-microns from 1 micron or so presently used. To realize such a small unit, a technique for shortening the wavelength of a laser beam, a technique for increasing the numerical aperture (NA) of an objective lens, or the like has been introduced into the apparatus itself.

Therefore, an objective lens drive apparatus according to conventional standards cannot achieve recording or reproduction of information onto or from an optical information recording medium based on a new standard any more. An objective lens drive apparatus which satisfies a new standard can achieve recording or reproduction of information with respect to an optical information recording medium based on a new standard, while there is a possibility that recording or reproduction of information with respect to an optical information recording medium based on conventional standards. Therefore, there has been a demand for an objective lens drive apparatus which achieves recording or reproduction of information for optical information recording media of both conventional and new standards.

SUMMARY OF THE INVENTION

Therefore, the present invention has an object of providing an objective lens drive apparatus which is capable of solely performing recording or reproduction of information for optical recording media of various different standards. According to a first aspect or the present invention, an objective lens drive apparatus comprises a movable member which can be moved along a surface of an optical information recording medium; an objective lens installed on the movable member, for allowing a light beam to pass and for concentrating the beam onto an optical information recording medium; a first diaphragm member installed on the movable member, having a first opening for determining the diameter of the light beam passing; and a second diaphragm member provided such that the second diaphragm member can be excluded from or inserted into the light path of the light beam and has a second opening for determining the diameter of the light beam passing.

The objective lens drive apparatus described above may be provided with a rotation shaft for rotatably and movably supporting the second diaphragm member when inserting and excluding the second diaphragm member. In this case, the rotation shaft preferably supports a portion of the center of gravity of the second diaphragm member.

In addition, the first opening of the first diaphragm member is preferably smaller than the second opening of the second diaphragm member. The opening of the second diaphragm member may be formed in an elliptic shape which is shorter in a radial direction of the optical information recording medium.

The objective lens drive apparatus may further comprise a control circuit for inserting or excluding the second diaphragm member in accordance with a kind of the optical information recording medium.

The movable member may be arranged such that the objective lens can be moved to a position outside an outermost periphery of a recording area of the optical information medium. In this case, the second diaphragm member is preferably arranged such that the second diaphragm member can be inserted into or excluded from the light path of the light beam when the objective lens is positioned outside the outermost periphery of the recording area of the optical information recording medium.

The second diaphragm member may comprise a magnetic material which maintains the second diaphragm member inserted, by a magnetic attraction force, when the second diaphragm member is inserted in the light path of the light beam.

According to a second aspect of the present invention, the objective lens drive apparatus comprises a movable member which can be moved along a surface of an optical information recording medium; an objective lens installed on the movable member, for allowing a light beam to pass and for concentrating the beam onto an optical information recording medium; a first diaphragm member installed on the movable member, having a first opening for determining the diameter of the light beam passing; and a second diaphragm member which moves together with the movable member and has a second opening which determines a diameter of light beam passing, the second diaphragm member being provided at a position relative to the movable member which changes when the second diaphragm member is brought into contact with another member while the movable member is moving, thereby to realize exclusion or insertion of the light path from or into the light path of the light beam.

In the objective lens drive apparatus described above, a static friction force is preferably effected between the second diaphragm member and the movable member.

In addition, the objective lens drive apparatus may further comprise a projecting member for restricting a movement range when the movable member is moved.

The objective lens drive apparatus may further comprise a rotation shaft for rotatably and movably supporting the second diaphragm member when excluding or inserting the second diaphragm member. In this case, the rotation shaft preferably supports a portion of the center of gravity of the second diaphragm member.

The first opening of the first diaphragm member is preferably smaller than the second opening of the second diaphragm member.

The objective lens drive apparatus may further comprise a control circuit for inserting or excluding the second diaphragm member in accordance with a kind of the optical information recording medium.

The objective lens drive apparatus may further comprise a subsidiary coil for adjusting a position of the movable member by a Lorentz force after the second diaphragm member is inserted or excluded.

The second diaphragm member is preferably provided in a side opposite to the optical information recording medium with the objective lens interposed therebetween.

The second diaphragm member may be enclosed in the movable member.

The objective lens drive apparatus may further comprise elastic protect means for coating a part of the second diaphragm member. In this case, the elastic protect means is made of a rubber film, for example.

According to a third aspect of the present invention, the objective lens drive apparatus comprises a movable member which can be moved along a surface of an optical information recording medium; an objective lens installed on the movable member, for allowing a light beam to pass and for concentrating the beam onto an optical information recording medium; a first diaphragm member installed on the movable member and having a first opening for determining the diameter of the light beam passing; a second diaphragm member provided such that the second diaphragm member can be excluded from or inserted into the light path of the light beam, and having a second opening for determining the diameter of the light beam passing; and an engaging member which is engaged with the second diaphragm member when the second diaphragm member is excluded or inserted.

In the objective lens drive apparatus, the second diaphragm member may be arranged such that the second diaphragm member can be excluded from or inserted into the light path when the second diaphragm member is moved apart from the optical information recording medium to a predetermined position. The movable member may be arranged such that the objective lens can be moved to a position outside an outermost periphery of a recording area of the optical information recording medium. In this case, the engaging member is preferably engaged with the second diaphragm member when the objective lens moves to a position outside the outermost periphery of the recording area of the optical information recording medium.

The movable member may be arranged such that the objective lens can be moved to a position inside an innermost periphery of a recording area of the optical information recording medium. In this case, the engaging member is preferably engaged with the second diaphragm member when the objective lens moves to a position inside the innermost periphery of the recording area of the optical information recording medium.

The objective lens drive apparatus may further comprise a rotation shaft for rotatably and movably supporting the second diaphragm member when inserting and excluding the second diaphragm member. In this case, the rotation shaft preferably supports a portion of the center of gravity of the second diaphragm member.

The first opening of the first diaphragm member is preferably smaller than the second opening of the second diaphragm member.

In the above structure, it is possible to provide an objective lens drive apparatus which solely performs recording or reproduction of information with respect to various optical information recording media according to different standards.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 7 is a view showing the structure of an optical processing system and a signal processing system of the optical disc apparatus shown in FIG. 1;

FIG. 8 is a plan view showing a structure of the shutter according to a second embodiment;

FIG. 9 is a cross-section showing a structure of the shutter according to a second embodiment;

FIG. 10 is a plan view showing a structure of the shutter according to a third embodiment;

FIG. 12 is a plan view showing a structure of an objective lens drive apparatus according to the fourth embodiment;

FIG. 13 is a cross-section showing a structure of the objective lens drive apparatus according to the fourth embodiment;

FIGS. 15A to 15F are views for explaining the shutter operation in the objective lens drive apparatus according to the fourth embodiment;

FIG. 24 is a side view showing a structure of the lens holder shown in FIG. 22;

FIG. 25 is a plan view showing a structure of the lens holder shown in FIG. 22;

FIG. 26 is a plan view showing a structure of the shutter shown in FIG. 22;

FIG. 27 is a cross-section showing a structure of a magnetic circuit for driving the lens holder shown in FIG. 23;

FIG. 28 is a plan view showing a structure of a coil unit arranged facing a magnetic circuit shown in FIG. 27;

DETAILED DESCRIPTION OF THE PREFERRED EMBODIMENTS

In the following, the embodiments of the present invention will be explained with reference to the drawings.
(First Embodiment)

Figure 1:
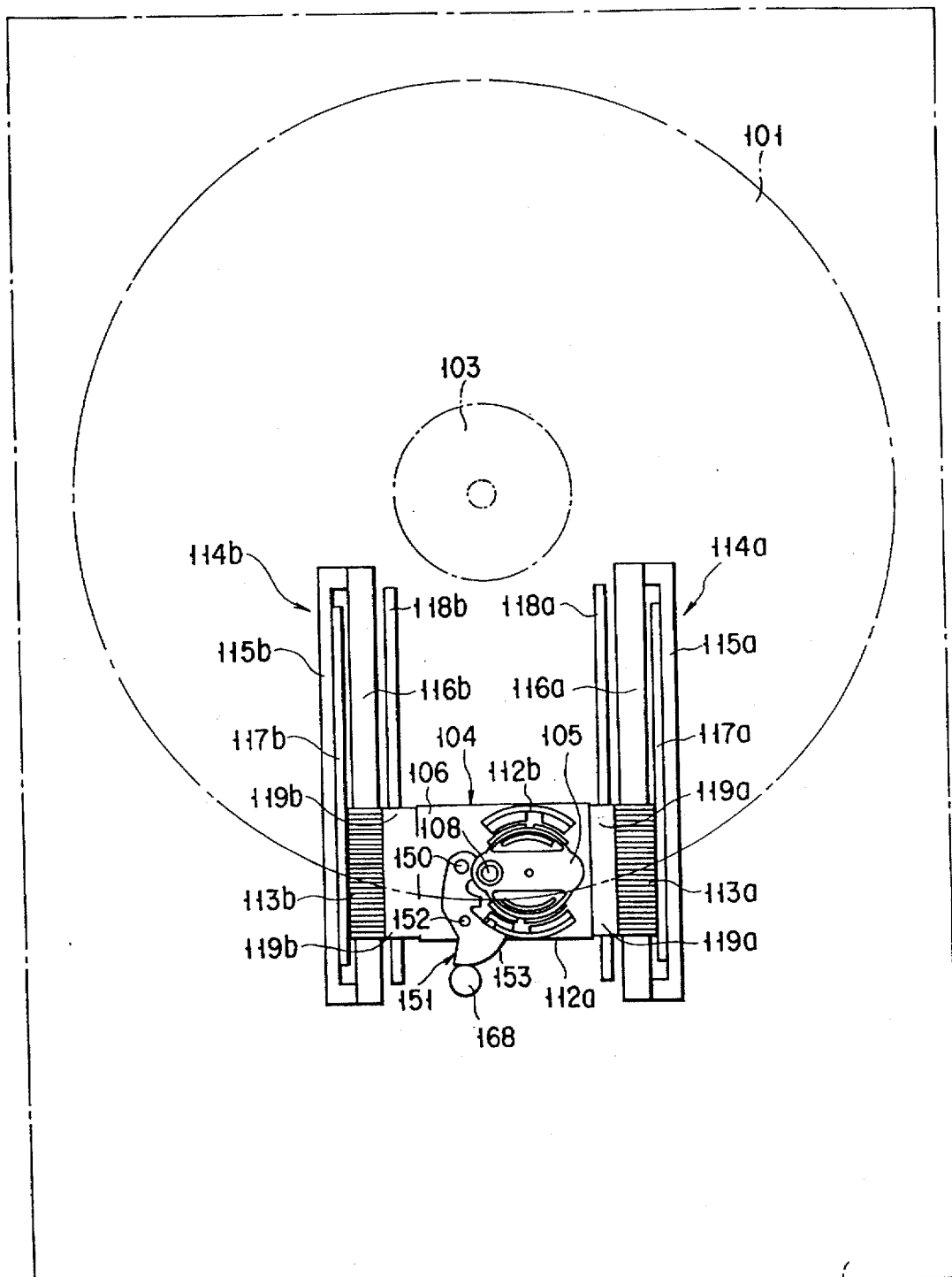
FIG. 1 is a plan view showing the entire of an optical disc apparatus according to first to third embodiments of the present invention.
Figure 2:
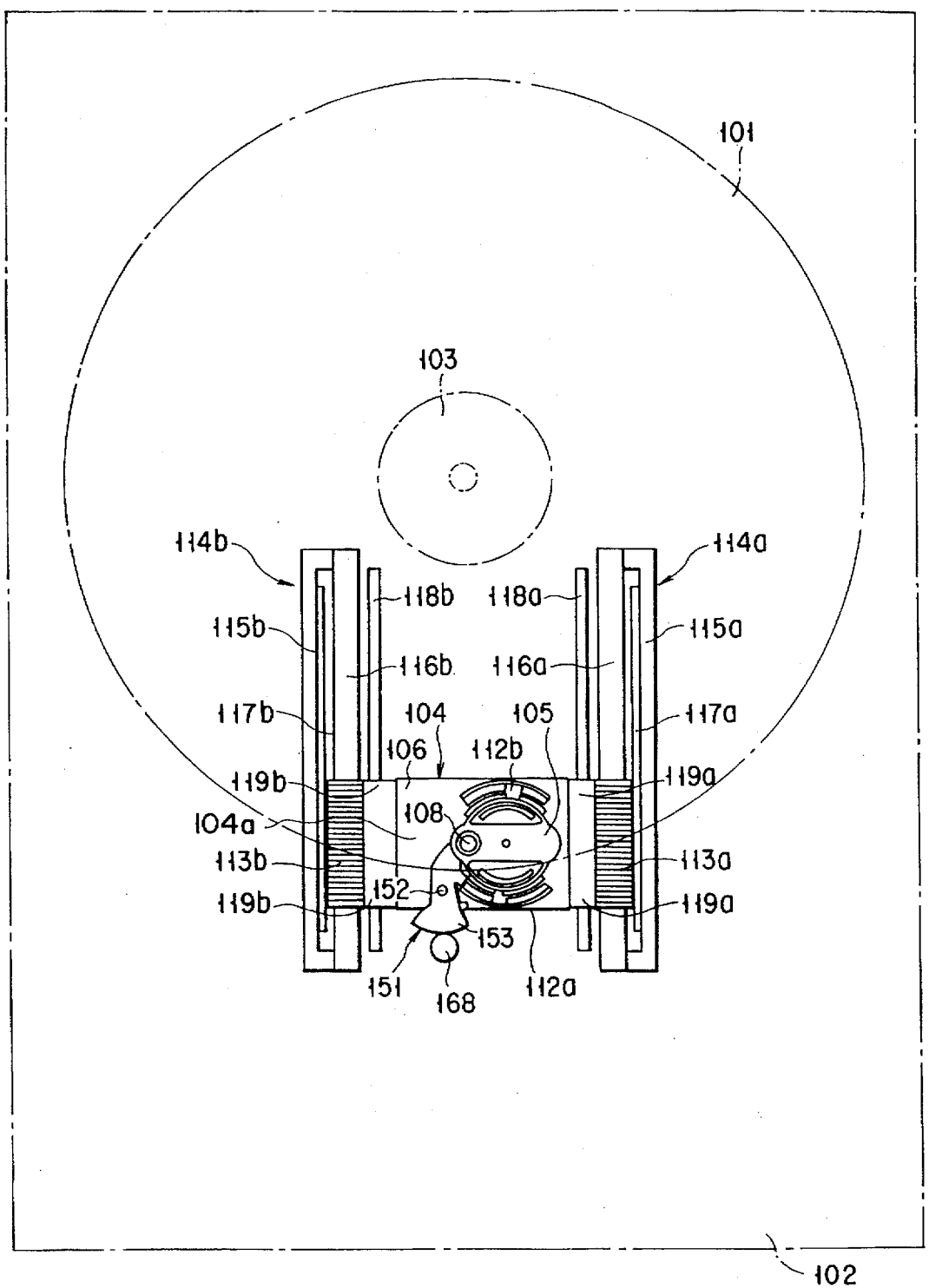
FIG. 2 is a plan view showing the entire structure of the optical disc apparatus where the shutter shown in FIG. 1 is inserted.
Figure 3:
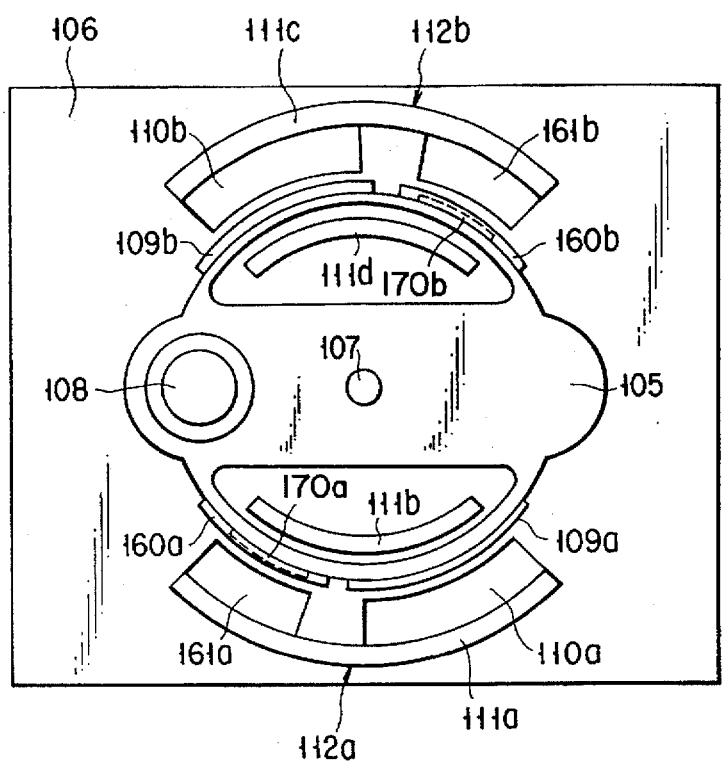
FIG. 3 is a plan view showing a structure of an objective lens drive apparatus shown in FIG. 1.
Figure 4:
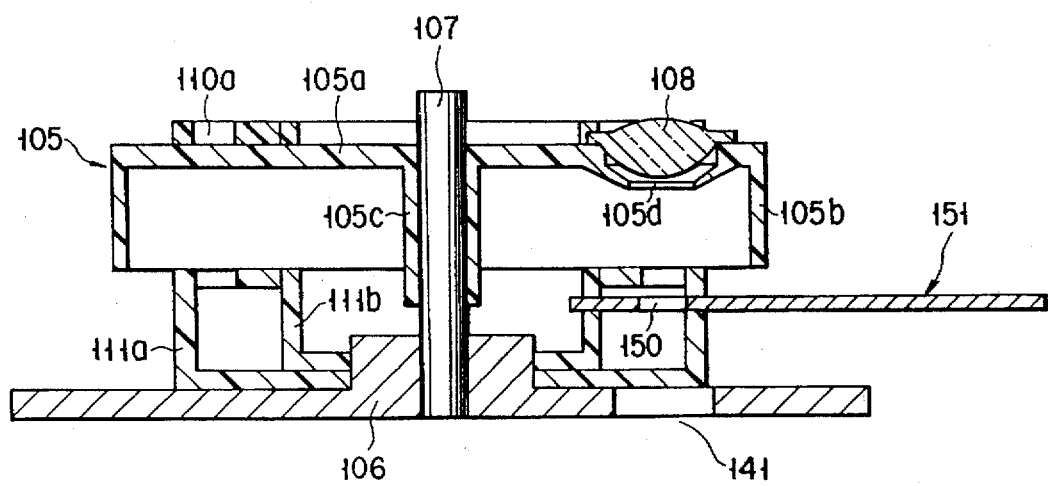
FIG. 4 is a cross-section showing the structure of the objective lens drive apparatus shown in FIG. 1.
Figure 5:
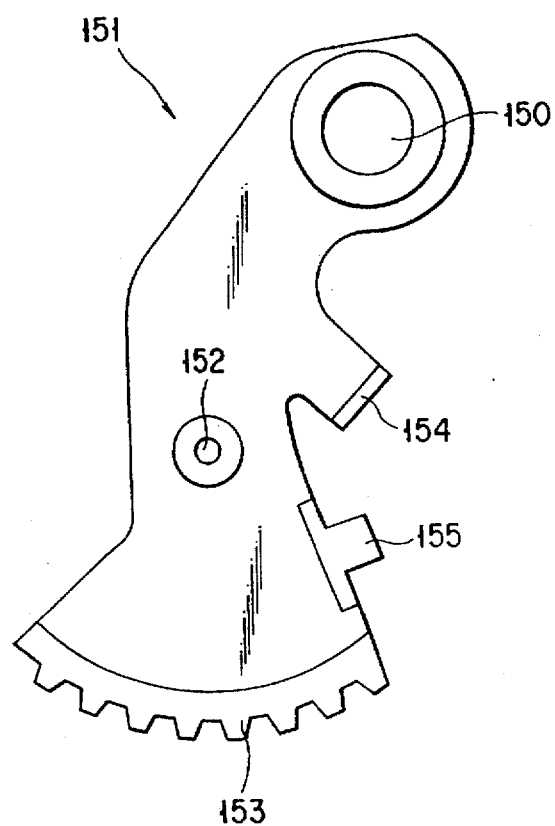
FIG. 5 is a plan view showing a structure of the shutter according to a first embodiment.
Figure 6:
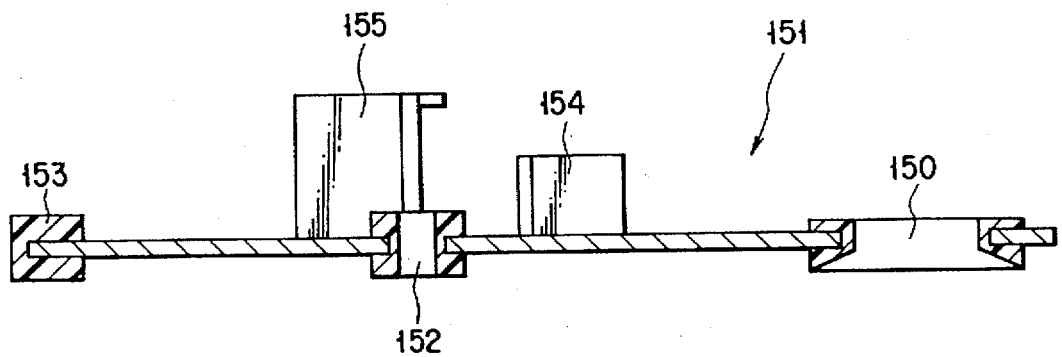
FIG. 6 is a cross-section showing a structure of the shutter according to a first embodiment.

At first, the first embodiment will be explained with reference to FIGS. 1 to 7. Here, FIG. 1 is a plan view showing the entire structure of the optical disc apparatus incorporating the objective lens drive apparatus according to the first embodiment (and will be also referred in the following second and third embodiments). FIG. 2 is a plan view showing the entire structure of the optical disc apparatus in a state where the shutter showing in FIG. 1 is inserted. FIG. 3 is a cross-section showing the structure of the objective lens drive apparatus shown in FIG. 1. FIG. 4 is a cross-section showing the structure of the objective lens drive apparatus shown in FIG. 1. FIG. 5 is a plan view showing the structure of the shutter according to the first embodiment. FIG. 6 is a cross-section showing the structure of the shutter according to the first embodiment. FIG. 7 is a view showing the structure of the optical processing system and the signal processing system shown in FIG. 1

A disc 101 (e.g., an optical disc or an magneto-optical disc) used for recording and reproducing information is held on a spindle motor 103 fixed on a base 102, by a chucking means such as a magnet chuck or the like. The disc is stably rotated by a spindle motor 103 when recording or reproducing information.

A carriage 104 is provided close to a lower portion of the disc 103. A movable member (or a lens holder) 105 is mounted on the carriage 104. As will be described later, the lens holder 105 is supported so as to be movable in the diameter direction and in the thickness direction of the disc 101.

The lens holder 105 is provided with a plate-like blade 105a opposing the surface of the disc 101, a cylindrical coil bobbin 105b fixed on a lower portion of the blade 105a. In addition, a slide bearing 105c is provided in the center of the blade 105a and the coil bobbin 105b.

A rotation shaft 107 having an end fixed and standing on a magnetic circuit base 106 is inserted and engaged in the slide bearing 105c with a slight clearance (of 10 microns or less), thereby constituting a slide bearing mechanism (or a shaft slide mechanism). Further, the lens holder 105 is capable of rotating around the rotation shaft 107 and of moving in parallel in the axial direction.

An objective lens 108 is fixed on the blade 105a, and a counter weight not shown is fixed on the side opposing the objective lens 108, with the rotation shaft 107 interposed therebetween. At a lower portion of the objective lens 108, a diaphragm portion 105d is provided which has a numerical aperture (NA) of, e.g., 0.6. The first diaphragm portion 105d is, for example, constituted by providing a hole having a predetermined diameter in engineer plastics such as PPS, such that the diaphragm portion is integral with the blade 105a. In addition, the first diaphragm portion 105d is provided on a light path of a laser beam including an objective lens 108.

On the side of the coil bobbin 105b, two rectangular sheets of focus coils 109a and 109b are provided wound flatly thereon, and also two rectangular sheets of tracking coils 160a and 160b are stuck and wound flatly thereon. The two focus coils 109a and 109b are respectively stuck on positions which are symmetrical with each other with respect to the rotation shaft 107, and also, the two tracking coils 160a and 160b are respectively stuck on positions which are symmetrical with each other.

Further, magnetic circuits 112a and 112b which are formed of permanent magnets 110a, 110b, 161a, and 161b as well as yokes 111a, 111b, 111c, and 111d are provided on the magnetic circuit base 106, to constitute a symmetrical positional relation with respect to the rotation shaft 107. As shown in FIG. 3, the focus coils 109a and 109b as well as the tracking coils 160a and 160b are interposed between the permanent magnets 110a, 110b, 161a, and 161b as well as the yokes 111c and 111d, and oppose each other with a predetermined magnetic gap inserted therebetween. The permanent magnets 110a and 110b apply a magnetic field to focus coils 109a and 109b, while the permanent magnets 161a and 161b apply a magnetic field to the tracking coils 160a and 160b.

The yokes 111a, 111b, 111c, and 111a forming part of the magnet circuits 112a and 112b are fixed on the magnetic base 106 by means of welding, caulking, or the like.

The permanent magnets 110a and 110b have a magnetic direction equal to the axial direction of the rotation shaft 107, while the magnetic direction of the permanent magnets 161a and 161b is equal to the direction perpendicular to the magnetic direction of the permanent magnets 110a and 10b. These two magnetic circuits 112a and 112b have a same structure.

Then, the focus coils 109a and 109b are rendered electrically conductive, and are simultaneously applied with magnetic flux by the permanent magnets 110a and 110b, thereby generating a Lorentz force, so that the lens holder 105 is driven to cause a fine parallel movement in the thickness direction of the disc 101 (or the axial direction of the rotation shaft 107). In addition, the tracking coils 160a and 160b are rendered electrically conductive and are simultaneously applied with magnetic flux by the permanent magnets 161a and 161b, thereby causing a Lorentz force, so that the lens holder 105 is driven to make a fine parallel movement in the radial direction of the disc 101 (around the rotation shaft 107).

In positions apart from each other by 180° around the coil bobbin 105b, two sheets of magnetic members 170a and 170b, made of iron pieces or the like, are respectively provided in the center of the tracking coils 160a and 160b (i.e., in the hollow portions of these wound coils). These two magnetic members 170a and 170b are stuck on positions which are symmetrical to each other with respect to the rotation shaft 107. When one objective lens 108 exists within a light path 141 (which will be described later), these magnetic members 170a and 170b constitute a relation that these members 170a and 170b are just clamped between the permanent magnets 161a and 161b and the yokes 111c and 111d.

A shutter 151 on which a second diaphragm portion 150 set to have an opening smaller than the first diaphragm portion 105d, e.g., a numerical aperture (NA) of 0.3 is fixed is rotatably installed around the magnetic circuit base 106 through the rotation bearing 152. By rotating this shutter 151, the second diaphragm portion 150 is inserted into or ejected from a light path of a laser beam including an objective lens 108.

The shutter 151 is made of metal such as stainless or the like, and the second diaphragm portion 150, the rotation shaft 152, and the rack 153 are made of resin by molding, such that these members are subjected to outsert formation. Note that the rack 153 is formed in order to transmit a drive force for rotating the shutter 151 around the rotation bearing 15Z (details or which will be described later).

In addition, the accuracy of distances between each of the second diaphragm portion 150, the rotation shaft 152, and the rack 153 depends on the accuracy of boring processing performed on a metallic mold (i.e., of the shutter 151) before forming molds of those members.

The shutter 151 is provided with first and second suction portions 154 and 155, respectively. In this structure, when the second diaphragm portion 150 is inserted in the light path, the first suction portion 154 and the magnetic circuit 112a are magnetically attracted from each other (as shown in FIG. 2) and the shutter 151 is kept inserted. In addition, when the second diaphragm portion 150 is excluded out of the light path, the second suction portion 155 and the magnetic circuit 112a are magnetically attracted from each other (as shown in FIG. 1) and the shutter 151 is kept excluded.

Note that the center of gravity of the entire weight of the shutter 151 is designed so as to substantially correspond to the center of rotation (i.e., the rotation bearing 152).

A pair of radial coils 113a and 113b are respectively installed on both ends of a fixing portion 104a of the carriage 104. These radial coils 113a and 113b are applied with a magnetic field from radial magnetic circuits 114a and 114b.

The radial magnetic circuits 114a and 114b comprise back yokes 115a and 115b, center yokes 116a and 116b, and permanent magnets 117a and 117b, and the radial coils 113a and 113b are movably inserted in a magnetic gap defined by center yokes 116a and 116b, as well as permanent magnets 117a and 117b. In addition, two radial magnetic circuits 114a and 114b have a same structure, and the magnetic direction of the permanent magnets 117a and 117b is equal to the thickness direction of the magnetic gap.

Further, two pairs of (four) slide bearings 119a and 119b are provided in the left and right sides of the fixing portion 104a of the carriage 104. Two guide rails 118a and 118b are provided in parallel in a relation that the guide rails are inserted in those slide bearings. Note that both ends of the guide rails 118a and 118b are fixed on the base 102. The carriage 104 is supported so as to be movable along the guide rails 118a and 118b.

When the radial coils 113a and 113b are rendered conductive and are simultaneously applied with magnetic flux by the radial magnetic circuits 114a and 114b, a Lorentz force is generated and the magnetic circuit base 106 is moved in parallel in the radial direction of the disc 101.

Note that the magnetic gap width of the radial magnetic circuits 114a and 114b is formed to be sufficiently long in the same direction, so that the magnetic circuit base 106 can be moved by a necessary distance in the lengthwise direction of the guide rails 118a and 118b, i.e., so that objective lens 108 can be moved in the radial direction from the outermost periphery of the disc 101 to the innermost periphery thereof.

The radial magnetic circuits 114a and 114b have a length enough to move the objective lens 108 mounted on the carriage 104 to a position much outer than the outermost periphery of the recording area of the disc 101. Further, when the carriage 104 is moved to a position much outer than the outermost periphery of the disc 101, a pinion 168 of a drive motor fixed on the base 102 is engaged with the rack 153 provided at a side portion of the shutter 151. By controlling the drive motor to rotate the pinion 168, the shutter 151 can be rotated in an arbitrary direction by a given angle.

Next, the optical system and signal processing system of the optical disc apparatus stated above will be explained with reference to FIG. 7.

A laser beam to be irradiated on the disc 101 is generated by an optical unit 120 which is fixed on a lower portion of the carriage 104 and is integrally movable together with the carriage. A laser beam LB irradiated from a semiconductor laser 121 in the optical unit 120 is converted into a parallel beam through a collimator lens 122, and is bent by 90° by a first beam splitter 123a, thus being introduced into the carriage 104 from the radial direction of the disc 101. A light path 141 (e.g., a space) for introducing the laser beam LB is provided at the bottom of the carriage 104, and the laser beam LB is injected into the objective lens 108 through the light path 141. The laser beam LB injected into the objective lens 108 is supplied with predetermined convergence, so that the laser beam is focused onto an information storage surface of a disc 101.

When the system is in a state where information is recorded, a laser beam LB introduced to the disc 101 is subjected to intensity modulation in correspondence with information recorded on the information recording surface, i.e., in correspondence with presence or absence of a fine pit. Thereafter, the laser beam is repeated to the objective lens 108, again. The reflected laser beam LB is introduced again to a fixed optical unit 120 through the light path 141. The laser beam LB then passes through the first beam splitter 123a, and is then divided by a second beam splitter 123b into two paths, and the divided beams respectively form images on first and second light detectors 125a and 125b through focusing lenses 124a and 124b, respectively.

Each of the reflected laser beams LB introduced into the light detectors 125a and 125b is converted into an electric signal corresponding to the size of a beam spot, and is supplied to a track control circuit 127 and focus control circuit 128 provided in a control portion 126. Signals generated in these track control circuit 127 and the focus control circuit 128 are used as a focus offset signal and a track offset signal for the objective lens 108, to control the focus direction and the track direction.

By thus using focus offset signals and track offset signals, a dislocation of the objective lens 108 in the focus direction (i.e., a focus dislocation) is detected, and current values supplied to the focus coils 109a and 109b are controlled so as to correct the positional dislocation. In addition, a positional dislocation of the objective lens 108 is detected by using the track offset signal, and current values supplied to the tracking coils 160a and 160b are controlled so as to correct the positional dislocation.

In addition, the reflected laser beam LB introduced to the light detector 125b is also supplied to an information reproduction circuit 129. This information may be of various information recorded on the disc 101, which is sent to a host system not shown (e.g., a personal computer or the like) and is outputted as a character, a static image, or a moving image through a display, or as music or a voice through a loud speaker. In this case, the carriage 104 follows the track on the information recording surface of the disc 101, and the movement thereof is controlled in the radial direction by large driving or fine driving.

Note that the control portion 126 includes a recording signal generator circuit 130 which generates a recording signal in accordance with information inputted from an external host system not shown (e.g., a personal computer or the like), and a diaphragm control circuit 131 which generates a signal for controlling rotation of the shutter 151 in order to locate the second diaphragm portion 150 within the light path of the laser beam LB described above.

Next, switching control of the second diaphragm portion 150 will be explained below.

The disc 101 which can be used in the objective lens drive apparatus of this embodiment is not limited to only one kind of disc, unlike a conventional apparatus, but it is possible to use a plurality of kinds of discs according to different standards, e.g., discs having different disc recording densities, different curvature tolerances, different disc substrate thicknesses, and the like. For example, not only a CD-ROM disc, but also an MO disc and a PC disc can be used. Further, two diaphragm portions 105d and 150 used in this embodiment are prepared so as to comply with processing of a usable disc.

For example, in case of using a disc which requires a reduction in spot diameter of a laser beam LB, control is performed such that only the first diaphragm portion 105d is used and the second diaphragm portion 150 is excluded out of the second diaphragm portion 150. In this manner, the first diaphragm portion installed on the lens holder 105 determines the effective light flux diameter, and enlarges the NA. In addition, in case of using a disc which requires an increase in spot diameter of a laser beam LB, it is possible to reduce the NA by performing control such that the first diaphragm portion 105d and the second diaphragm portion 150 are simultaneously inserted into the light path.

A user places a desired disc 101 on a spindle motor 103, and inputs the kind of the disc 101 (such a CD-ROM disc or a PC disc which is information as a disc of a different standard) from a host system (e.g., from a personal computer or the like). A signal thus inputted is sent to a diaphragm control circuit 131, and control is performed such that the second diaphragm portion 150 is moved to a predetermined position in the light path 141 for a laser beam LB.

At first, upon receipt of a signal from the diaphragm control circuit 131, the carriage 104 is driven to move to a position much outer than the outermost periphery of the disc 101. Further, the pinion 168 of the drive motor fixed on the base 102 is engaged with the rack 153 provided on the shutter 151, as is shown in FIG. 1. After detection of a state in which both of the pinion and the rack are engaged, a torque is applied by a drive motor, and then, the torque is transmitted to the shutter 151. As a result of this, the second diaphragm portion 150 can be rotated.

Then, as described above, the first suction portion 154 and the magnetic circuit 112a are made electrically attracted with each other (FIG. 2), and thus, the shutter 151 is kept inserted.

In the case where a placed disc 1 requires a second diaphragm portion 150 and where the second diaphragm portion 150 has already been moved into the light path, it is not necessary to control rotation of the shutter 151 by moving the carriage 104.

In the case where a placed disc 1 does not require the second diaphragm portion 150 and where the second diaphragm portion 150 has already been moved into the light path, rotation of the shutter 151 is controlled by moving the carriage 104 and the second diaphragm portion 150 is thereby excluded. In this case, the second suction portion 155 and the magnetic circuit 112a are magnetically attracted from each other (FIG. 1), and the shutter 151 is thus kept excluded.

According to the objective lens drive apparatus or this embodiment which operates in the manner as described above, the numerical aperture can be switched depending on the standard and the specification of a disc, so that it is not necessary to prepare a plurality of specific (individual) objective lens drive apparatuses in compliance with standards of discs and usage thereof. Therefore, there is provided an objective lens drive apparatus which is alone capable of performing recording or reproduction of various information.

In addition, this embodiment is arranged such that the first diaphragm portion 105d having a large numerical aperture is fixed on a lower portion of the objective lens 108, and the second diaphragm portion 150 having a small numerical aperture can be inserted into and/or excluded from the light path 141. Therefore, when a margin for aberration is optically small, i.e., when the spot diameter of a laser beam LB irradiated onto the disc 101 is small, it is possible to restrict aberration to be caused to a small value even if the objective lens 108 is moved in the tracking direction. Thus, excellent recording and reproduction of signals can be realized.

Further, as is apparent from FIG. 5, the second diaphragm portion 150, the rotation bearing 152, and the rack 153 are arranged on the shutter 151 in this order. Thus, the shutter has a structure capable of assuring that a center of rotation (or the rotation bearing 152) is substantially equal to a center of gravity. Naturally, the shutter 151 according to this embodiment has a structure in which the center of rotation is substantially equal to the center of gravity, the second diaphragm portion 150 does not derive from the light path but constantly stable recording and reproduction can be realized even under influence of acceleration which occurs when the carriage 104 is moved at a high speed or which is caused due to impacts applied from outside.

Furthermore, since this structure is arranged such that the shutter 151 is kept inserted and/or excluded by a magnetic attraction force between the magnetic circuit 112a and the shutter 151, mechanical locking need not be additionally adopted. Therefore, the weight of the carriage 104 can be reduced to be small, and the carriage 104 can be moved at a high speed. Also, since mechanical locking is not adopted, there is no possibility of occurrence of dust which pollutes optical systems. In addition, the shutter 151 on which the second diaphragm portion 150 is formed is made of stainless or the like. Therefore, a pealing force for releasing attraction with the magnetic circuit 112a can be reduced with attraction with the magnetic circuit 112a being maintained, when positioning of the second diaphragm portion 150 is controlled. For example, in comparison with a case where general iron is adopted, the pealing force is greatly reduced, positioning control is extremely facilitated. In addition, magnetism of stainless itself does not substantially influence the characteristics of the magnetic circuit 112 and the driving force is not lowered.

(Second Embodiment)

A second embodiment of the present invention will be explained with reference to FIGS. 8 and 9. FIG. 8 is a plan view showing the structure of a shutter according to the second embodiment. FIG. 9 is a cross-section showing the structure of the shutter according to the second embodiment. Note that in the second and third embodiments as will be explained later, the same components as those of the first embodiment will be denoted by the same reference symbols, to omit reiteration of explanation.

In the second embodiment, the shutter 151 is formed of, for example, such stainless as will render the shutter 151 flexible in the thickness direction. In addition, the center of gravity of the entire shutter 151 is designed so as to substantially correspond to the center of rotation (i.e., the rotation bearing 152).

In addition, in the first embodiment, the positioning of the shutter 151 is performed by the first suction portion 154 and the second suction portion 155. However, a projecting portion 156 is provided between the rotation bearing 152 and the second diaphragm portion 150, in this embodiment. This projecting portion 156 can be engaged with a concave portion not shown provided in the lens holder 105, in order to retain positions, one of which is a state where the second diaphragm portion 150 is inserted in the light path and another of which is a state where the second diaphragm portion 150 is excluded therefrom. Here, the shutter 151 is slightly flexible in the thickness direction, so that the shutter 151 can be bent in the thickness direction of the plate within the flexibility and the projecting portion 156 can easily be engaged with the concave portion by a flexibility recovering force.

In this embodiment comprising the shutter as described above, an opening can be switched and used in accordance with the standard or specification of a disc, and therefore, it is not necessary to prepare a plurality of (individual) objective lens drive apparatuses specific to the standards and specifications of discs. As a result, it is possible to provide an objective lens drive apparatus which alone performs recording and reproduction of information with respect to various optical discs and magneto-optical discs according to different standards.

(Third Embodiment)

Next, the third embodiment of the present invention will be explained with reference to FIG. 10. FIG. 10 is a plan view showing the structure of the shutter according to the third embodiment.

This embodiment is different from the first and second embodiments in the shape of the second diaphragm portion. Specifically, the second diaphragm portion in this embodiment is arranged such that the shape of this portion becomes an ellipse which is short in the radial direction of the disc 101 and is long in the direction in which the track extends. The second diaphragm portion 157 thus arranged forms an elliptical spot on the disc 101, which is longer in the direction perpendicular to the track.

By generating this kind of spot shape, spots are projected from both sides of the track, so that the edge of the pit in which a signal is recorded can be detected sharply.

In addition, since the spot shape is small in the radial direction of the disc, the aberration in this direction is reduced. Therefore, it is possible to obtain an optical system which is strong against inclinations of an objective lens and a light axis with respect to the radial direction of the disc. As a result, large advantages can be obtained for practical use.

According to the first to third embodiments described above, engagement between the rack and the pinion is used as a means for moving a shutter. However, if a pin is provided so as to project from near the pinion 168 in FIG. 1, for example, it is possible to constitute such a structure in which contact of the shutter with the pin is controlled thereby moving the shutter. In this case, the movement of the shutter is controlled in accordance with a movement amount of the carriage 104. Of course, the shutter may be moved in another method.

In addition, a plurality of objective lenses having different optical characteristics are fixed on both sides of the lens holder 105, around the rotation axis 107 as the center, and a diaphragm portion may be provided for each of these objective lenses. In this structure, an objective lens having less spherical aberration is selected in correspondence with the thickness of a disc substrate inserted, at first, and then, a diaphragm portion can be selected in correspondence with the spot diameter formed on the disc. Therefore, there is provided an objective lens drive apparatus which alone can perform recording or reproduction of information with respect to various optical discs and magneto-optical discs.

Although an objective lens drive apparatus comprising two diaphragm portions is recited in the above first to third embodiments, three or more diaphragm portions can be prepared if necessary. In this case, it is desirable that only the diaphragm portion having the largest opening is fixed and the other diaphragm portions are disposed in the order from the diaphragm portion having the larger numerical aperture.

(Fourth Embodiment)

Figure 11:
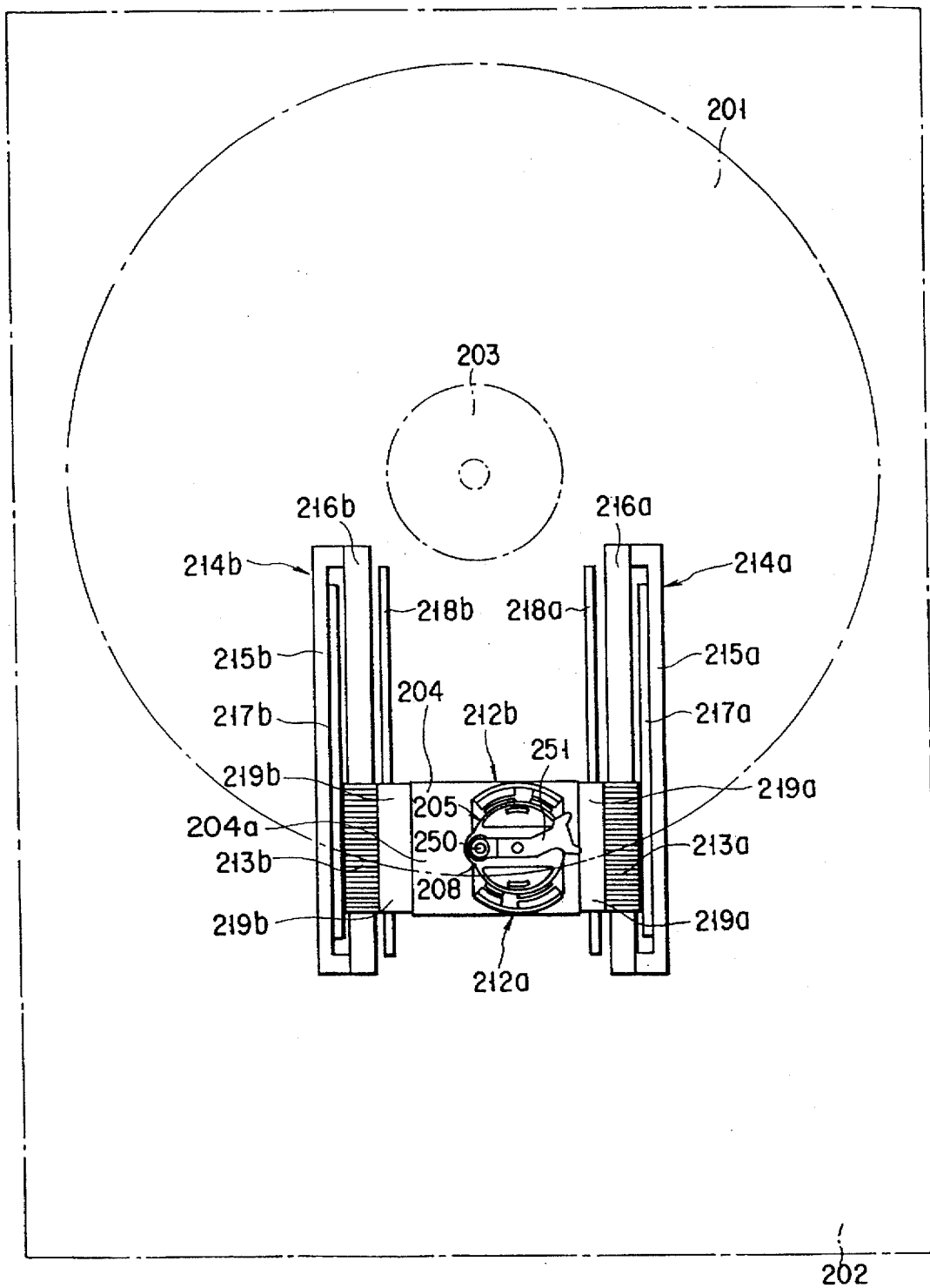
FIG. 11 is a plan view showing the entire structure of an optical disc apparatus incorporating an objective lens drive apparatus according to fourth to eighth embodiments of the present invention.
Figure 14:
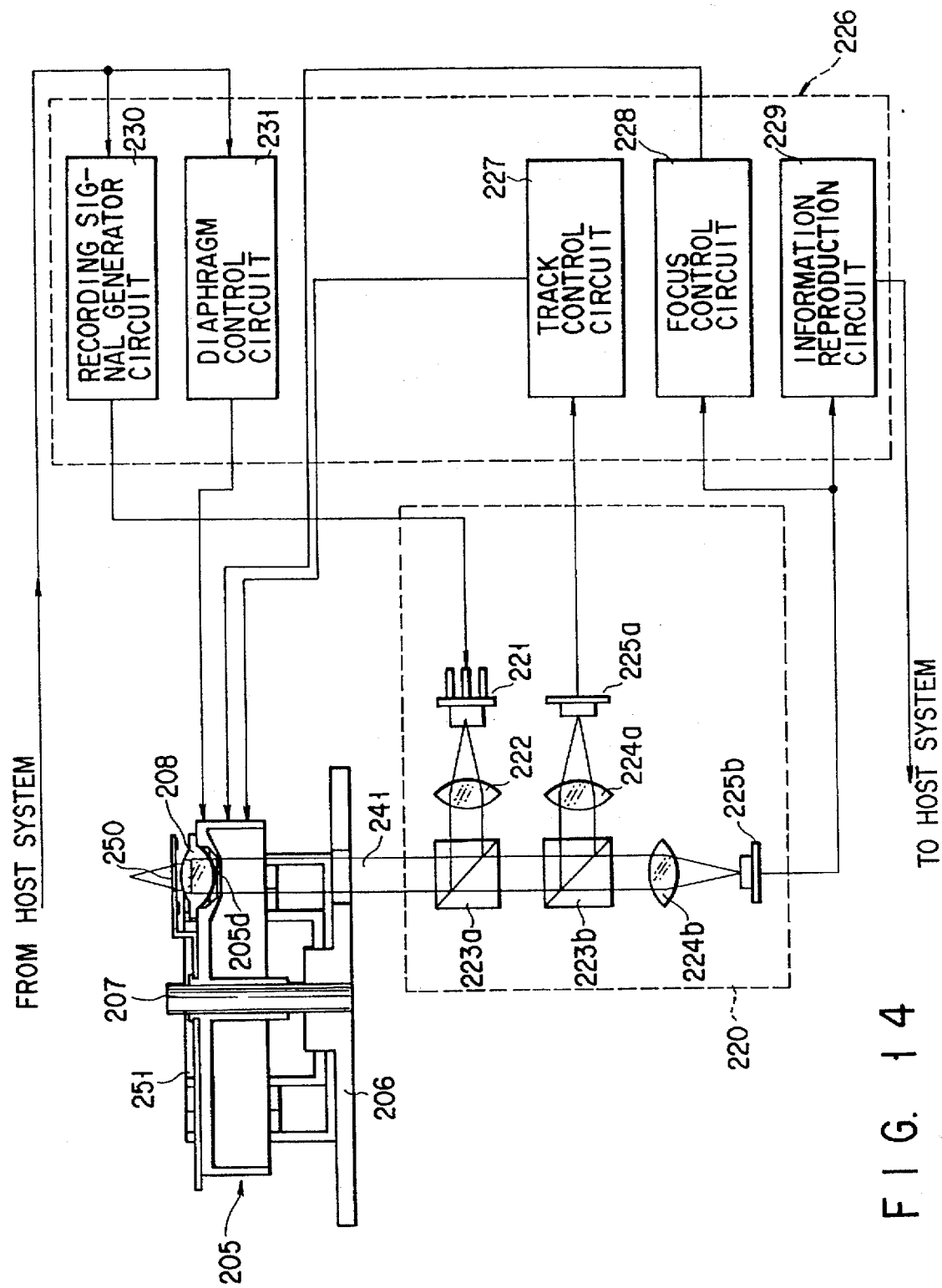
FIG. 14 is a view showing the structure of an optical processing system and a signal processing system of the optical disc apparatus shown in FIG. 11.

Next, the fourth embodiment of the present invention will be explained with reference to FIGS. 11 to 15. Here, FIG. 11 is a plan view showing the entire structure of an optical disc apparatus mounting an objective lens drive apparatus according to the fourth embodiment. FIG. 12 is a plan view showing the structure of the objective lens drive apparatus according to this embodiment. FIG. 13 is a cross-section showing the structure of an objective lens drive apparatus according to this embodiment. FIG. 14 is a view showing the structure of an optical processing system and a signal processing system of the optical disc apparatus shown in FIG. 11. FIGS. 15A to 15F are views for explaining operation of the shutter in the objective lens drive apparatus according to this embodiment.

A disc 201 (such as an optical disc, a magneto-optical disc, or the like) to be used for recording and reproduction of information is held on a spindle motor 203 fixed on a base 202, by a chucking means such as a magnet chuck of the like, and is driven to rotate stably by the spindle motor 203 when recording and reproduction is performed.

A carriage 204 is provided close to a lower portion of the disc 203. A movable member (or a lens holder) 205 is mounted on the carriage 204. As will be described later, the lens holder 205 is supported so as to be movable in the diameter direction and in the thickness direction of the disc 201.

The lens holder 205 is provided with a plate-like blade 205a opposing the surface of the disc 201, a cylindrical coil bobbin 205b fixed on a lower portion of the blade 205a. In addition, a slide bearing 205c is provided in the center of the blade 205a and the coil bobbin 205b.

A rotation shaft 207 having an end fixed and standing on a magnetic circuit base 206 is inserted and engaged in the slide bearing 205c with a slight clearance (of 10 microns or less), thereby constituting a slide bearing mechanism (or a shaft slide mechanism). Further, the lens holder 205 is capable of rotating around the rotation shaft 207 and of moving in parallel in the axial direction.

An objective lens 208 is fixed on the blade 205a, and a counter weight not shown is fixed on the side opposing the objective lens 208, with the rotation shaft 207 interposed therebetween. At a lower portion of the objective lens 208, a diaphragm portion 205d is provided which has a numerical aperture of, e.g., 0.6. The first diaphragm portion 205d is, for example, constituted by providing a hole having a predetermined diameter in engineer plastics such as PPS, such that the diaphragm portion is integral with the blade 205a. In addition, the first diaphragm portion 205d is provided on a light path 241 of a laser beam LB including an objective lens 208.

On the side of the coil bobbin 105b, two rectangular sheets of focus coils 209a and 209b are provided wound flatly thereon, and also two rectangular sheets of tracking coils 260a and 260b are stuck and wound flatly thereon. The two focus coils 209a and 209b are respectively stuck on positions which are symmetrical with each other with respect to the rotation shaft 207, and also, the two tracking coils 260a and 260b are respectively stuck on positions which are symmetrical with each other.

Further, magnetic circuits 212a and 212b which are formed of permanent magnets 210a, 210b, 261a, and 261b as well as yokes 211a, 211b, 211c, and 211d are provided on the magnetic circuit base 206, to constitute a symmetrical positional relation with respect to the rotation shaft 207. As shown in FIG. 12, the focus coils 209a and 209b as well as the tracking coils 260a and 260b are interposed between the permanent magnets 210a, 210b, 261a, and 261b as well as the yokes 211c and 211d, and oppose each other with a predetermined magnetic gap inserted therebetween. The permanent magnets 210a and 210b apply a magnetic field to focus coils 209a and 209b, while the permanent magnets 261a and 261b apply a magnetic field to the tracking coils 260a and 260b.

The yokes 211a, 211b, 211c, and 211d forming part of the magnet circuits 212a and 212b are fixed on the magnetic base 206 by means of welding, caulking, or the like.

The permanent magnets 210a and 210b have a magnetic direction equal to the axial direction of the rotation shaft 207, while the magnetic direction of the permanent magnets 261a and 261b is equal to the direction perpendicular to the magnetic direction of the permanent magnets 210a and 210b. These two magnetic circuits 212a and 212b have a same structure.

Then, the focus coils 209a and 209b are rendered electrically conductive, and are simultaneously applied with magnetic flux by the permanent magnets 210a and 210b, thereby generating a Lorentz force, so that the lens holder 205 is driven to cause a fine parallel movement in the thickness direction of the disc 201 (or the axial direction of the rotation shaft 207). In addition, the tracking coils 260a and 260b are rendered electrically conductive and are simultaneously applied with magnetic flux by the permanent magnets 261a and 261b, thereby causing a Lorentz force, so that the lens holder 205 is driven to make a fine parallel movement in the radial direction of the disc 201 (around the rotation shaft 207).

In positions apart from each other by 180° around the coil bobbin 205b, two sheets of magnetic members 270a and 270b made of iron pieces or the like are respectively provided in the center of the tracking coils 260a and 260b (i.e., in the hollow portions of these wound coils). These two magnetic members 270a and 270b are stuck on positions which are symmetrical each other with respect to the rotation shaft 207. When one objective lens 208 exists within a light path 241 (which will be described later), these magnetic members 270a and 270b constitute a relation that these members 270a and 270b are just clamped between the permanent magnets 261a and 261b and the yokes 211c and 211d.

In addition, a shutter 251, on which a first diaphragm portion 205d having an opening smaller than the first diaphragm portion 205d, e.g., on which a second diaphragm portion 250 set to a numerical aperture of 0.3 is formed, is rotatably engaged with a slide bearing 205c through the rotation bearing 252. By rotating this shutter 251, the second diaphragm portion 250 can be inserted in or excluded from the light path of a laser beam including the objective lens 208, as shown in FIGS. 15A to 15F.

Here, the shutter 251 is formed of non-magnetic material such as phosphor bronze, and has a restore ability (or a spring characteristic). Further, the rotation bearing 252 is subjected to outsert formation to be integral with the shutter 251.

Also, as shown in FIG. 12, a projecting portion 253 is provided between the rotation bearing 252 and the second diaphragm portion 250. This projecting portion 253 maintains the position of the shutter 251 in such a manner in which the portion 253 is engaged with a concave portion 254 when the second diaphragm portion 250 is inserted in the light path, while the projecting portion 253 is engaged with a concave portion 255 when the second diaphragm portion 250 is excluded from the light path. In addition, the concave portions 254 and 255 are formed on a blade 205a.

Further, as described above, the shutter 251 has a spring characteristic, and is slightly bent in the thickness direction within the flexibility range. Further, a pressing force is effected on the concave portion 254 or 255 from the projecting portion 253 due to the restore ability caused by the bending, thereby preventing positional dislocation of the shutter 251.

In addition, a cleaner 256 made of wool, felt, cloth, sponge, or the like is installed around the lower surface of the second diaphragm portion 250. Therefore, the surface of the objective lens 208 can be cleaned every time when the second diaphragm portion 250 is inserted in or excluded from the light path.

Meanwhile, two levers 269a and 269b are formed in the opposite side of the second diaphragm portion, with the rotation bearing 252 positioned as the boundary.

Note that the center of gravity of the entire weight of the shutter 251 is designed so as to substantially correspond to the center of rotation (i.e., the rotation bearing 252).

A pair of radial coils 213a and 213b are installed at both end portions of the fixing portion 204a of the carriage 204, at an equal distance from the center of and 213b are applied with a magnetic field from the radial magnetic circuits 214a and 214b fixed on the base 202.

The radial magnetic circuits 214a and 214b comprise back yokes 215a and 215b, center yokes 216a and 216b, as well as permanent magnets 217a and 217b. The radial coils 213a and 213b are movably inserted in a magnetic gap defined by the center yokes 216a and 261b and the permanent magnets 217a and 217b. Note that two radial magnetic circuits 214a and 214b have the same structure, and the magnetic direction of the permanent magnets 217a and 217b is the same as the thickness direction of the magnetic gap.

Further, two pairs of (four) slide bearings 219a and 219b are provided in the left and right sides of the fixing portion 204a of the carriage 204. Two guide rails 218a and 218b are provided in parallel in a relation that the guide rails are inserted in those slide bearings. Note that both ends of the guide rails 218a and 218b are fixed on the base 202. The carriage 204 is supported so as to be movable along the guide rails 218a and 218b.

When the radial coils 213a and 213b are rendered conductive and are simultaneously applied with magnetic flux by the radial magnetic circuits 214a and 214b, a Lorentz force is generated and the magnetic circuit base 206 is moved in parallel in the radial direction of the disc 201.

Note that the magnetic gap width of the radial magnetic circuits 214a and 214b is formed to be sufficiently long in the same direction, so that the magnetic circuit base 206 can be moved by a necessary distance in the lengthwise direction of the guide rails 218a and 218b, i.e., so that objective lens 208 can be moved in the radial direction from the outermost periphery of the disc 201 to the innermost periphery thereof.

Next, the optical system and the signal processing system of the optical disc system will be explained with reference to FIG. 14.

A laser beam LB to be irradiated on the disc 201 is generated by an optical unit 220 which is fixed on a lower portion of the carriage 204 and is integrally movable together with the carriage. A laser beam LB irradiated from a semiconductor laser 221 in the optical unit 220 is converted into a parallel beam through a collimator lens 222, and is bent by 90° by a first beam splitter 223a, thus being introduced into the carriage 204 from the radial direction of the disc 101. A light path 241 (e.g., a space) for introducing the laser beam LB is provided at the bottom of the carriage 204, and the laser beam LB is injected into the objective lens 208 through the light path 241. The laser beam LB injected into the objective lens 208 is supplied with predetermined convergence, so that the laser beam is focused onto an information storage surface of a disc 201.

When the system is in a state where information is recorded, a laser beam LB introduced to the disc 201 is subjected to intensity modulation in correspondence with information recorded on the information recording surface, i.e., in correspondence with presence or absence of a fine pit. Thereafter, the laser beam is repeated to the objective lens 208, again. The reflected laser beam LB is introduced again to a fixed optical unit 220 through the light path 241. The light beam then pass through the first beam splitter 223a, and is then divided by a second beam splitter 223b into two paths, and the divided beams respectively form images on first and second light detectors 225a and 225b through focusing lenses 224a and 224b, respectively.

Each of the reflected laser beams LB introduced into the light detectors 225a and 225b is converted into an electric signal corresponding to the size of a beam spot, and is supplied to a track control circuit 227 and focus control circuit 228 provided in a control portion 226. Signals generated in these track control circuit 227 and the focus control circuit 228 are used as a focus offset signal and a track offset signal for the objective lens 208, to control the focus direction and the track direction.

By thus using focus offset signals and track offset signals, a dislocation of the objective lens 208 in the focus direction (i.e., a focus dislocation) is detected, and current values supplied to the focus coils 209a and 209b are controlled so as to correct the positional dislocation. In addition, a positional dislocation of the objective lens 208 is detected by using the track offset signal, and current values supplied to the tracking coils 260a and 260b are controlled so as to correct the positional dislocation.

In addition, the reflected laser beam LB introduced to the light detector 225b is also supplied to an information reproduction circuit 229. This information may be of various information recorded on the disc 201, which is sent to a host system not shown (e.g., a personal computer or the like) and is outputted as a character, a static image, or a moving image through a display, or as music or a voice through a loud speaker. In this case, the carriage 204 follows the track on the information recording surface of the disc 201, and the movement thereof is controlled in the radial direction by large driving or fine driving.

Note that the control portion 226 includes a recording signal generator circuit 230 which generates a recording signal in accordance with information inputted from an external host system not shown (e.g., a personal computer or the like), and a diaphragm control circuit 231 which generates a signal for controlling rotation of the shutter 251 in order to locate the second diaphragm portion 250 within the light path of the laser beam LB described above.

Next, switching control of the second diaphragm portion 250 will be explained below.

The disc 201 which can be used in the objective lens drive apparatus of this embodiment is not limited to only one kind of disc, unlike a conventional apparatus, but it is possible to use a plurality of kinds of discs according to different standards, e.g., discs having different disc recording densities, different curvature tolerances, different disc substrate thicknesses, and the like. For example, not only a CD-ROM disc, but also an MO disc and a PC disc can be used. Further, two diaphragm portions 205d and 250 used in this embodiment are prepared so as to comply with processing of a usable disc.

For example, in the case of using a disc which requires a reduction in spot diameter of a laser beam LB, control is performed such that only the first diaphragm portion 205d is used and the second diaphragm portion 250 is excluded out of the second diaphragm portion 250. In this manner, the first diaphragm portion installed on the lens holder 205 determines the effective light flux diameter, and enlarges the NA. In addition, in the case of using a disc which requires an increase in spot diameter of a laser beam LB, it is possible to reduce the NA by performing control such that the first diaphragm portion 105d and the second diaphragm portion 250 are simultaneously inserted into the light path.

A user places a desired disc 201 on a spindle motor 203, and inputs the kind of the disc 201 (such a CD-ROM disc or a PC disc which is information as a disc of a different standard) from a host system (e.g., from a personal computer or the like). A signal thus inputted is sent to a diaphragm control circuit 231, and control is performed such that the second diaphragm portion 250 is moved to a predetermined position in the light path 241 for a laser beam LB.

In this embodiment, rotation driving of the shutter 251 is controlled with use of driving of the lens holder 205, when controlling the position of the second diaphragm portion 250.

At first, a diaphragm control circuit 231 supplies a track control circuit 227 with a control signal, thereby to control tracking coils 260a and 260b to be rendered electrically conductive. Further, the lens holder 205 is rotated beyond a tracking movable range. The lens holder 205 then moves to the position indicated in FIG. 15B from a neutral position indicated in FIG. 15A. In this state, a static friction force from the lens holder 205 is effected on the shutter 251, and integrally rotates, in synchronization with the lens holder 205.

In the state of FIG. 15B, a lever 269a of the shutter 251 collides with a magnetic circuit 212b, so that the shutter 251 cannot rotate anymore.

If the lens holder 205 is further rotated from this state, only the lens holder 205 rotates and positions of the shutter 251 and lens holder 205 relative to each other change as shown in FIG. 15C, so that the second diaphragm portion 205 overlapping the objective lens 208 moves.

Note that the yokes 211b and 211d standing inside the focus coils 209a and 209b as well as the tracking coils 260a and 260b limit the rotation angle of the lens holder 205, as is shown in FIG. 15C, and serve as a stopper for restricting excessive rotation of the lens holder 205.

In this state, the tracking coils 260a and 260b are rendered electrically conductive, to rotate the lens holder 205 in the reverse direction, thereby returning the objective lens 208 back to the neutral position. Then, the shutter 251 and the lens holder 205 are rotated while maintaining their relative positions, and are brought into a state in which only the first diaphragm portion 205d determines the opening of the objective lens 208, as shown in FIG. 15D.

If the second diaphragm portion 250 is required due to the characteristic of the disc 201, it is not necessary to perform operation as described above, but control is carried out so as to perform the following operation.

At first, the diaphragm control circuit 231 supplies the track control circuit 227 with a control signal, thereby to control the tracking coils 260a and 260b to be rendered electrically conductive. Further, the lens holder 205 is rotated in the reverse direction beyond the tracking movable range from the state as shown in FIG. 15D. The lens holder 205 then moves to a position indicated in FIG. 15E. In this state, the lens holder 205 also rotates while maintaining its position relative to the shutter 251.

In the state of FIG. 15A, the lever 269b of the shutter 251 collides with the magnetic circuit 212a, so that the shutter 251 cannot be rotated any more.

If the lens holder 205 is further rotated from this state, only the lens holder 205 is rotated, positions of the shutter 251 and the lens holder 205 relative to each other change, so that the second diaphragm portion arranged apart from the objective lens 208 moves to a state in which the diaphragm portion overlaps the lens.

Note that the yokes 211b and 211d standing inside the focus coils 209a and 209b as well as the tracking coils 260a and 260b limit the rotation angle of the lens holder 205, as is shown in FIG. 15C, and serve as a stopper for restricting excessive rotation of the lens holder 205.

In this state, the tracking coils 260a and 260b are rendered electrically conductive, to rotate the lens holder 205 in the reverse direction, thereby returning the objective lens 208 back to the neutral position. Then, the shutter 251 and the lens holder 205 are rotated while maintaining their relative positions, and are brought into a state in which only the first diaphragm portion 205d and the second diaphragm portion 250 determine the opening of the objective lens 208, as shown in FIG. 15D.

According to the objective lens drive apparatus of this embodiment which operates in the manner as described above, the numerical aperture can be switched depending on the standard and the specification of a disc, so that it is not necessary to prepare a plurality of specific (individual) objective lens drive apparatuses. Therefore, there is provided an objective lens drive apparatus which alone is capable of performing recording or reproduction of various information.

In addition, this embodiment is arranged such that the first diaphragm portion 205d having a large numerical aperture is fixed on a lower portion of the objective lens 208, and the second diaphragm portion 250 having a small numerical aperture can be inserted into and/or excluded from the light path 241. Therefore, when a margin for aberration is optically small, i.e., when the spot diameter of a laser beam LB irradiated onto the disc 201 is small, it is possible to restrict aberration to be caused to a small value even if the objective lens 208 is moved in the tracking direction. Thus, excellent recording and reproduction of signals can be realized.

Further, the structure is arranged such that the objective lens 208 and the second diaphragm portion 250 are integrally movable when the lens holder 205 is subjected to tracking driving. Therefore, it is possible to extremely avoid occurrence of aberration caused by an error in the positioning between the second diaphragm portion 250 and the objective lens 208.

In addition, since the shutter 251 having the second diaphragm portion 250 has a structure in which the center of rotation substantially corresponds to the center of gravity, the second diaphragm portion 250 does not derive from the light path but constantly stable recording and reproduction can be realized even under influence of acceleration which occurs when the carriage 204 is moved at a high speed or which is caused due to impacts applied from outside.

(Fifth Embodiment)

Figure 16:
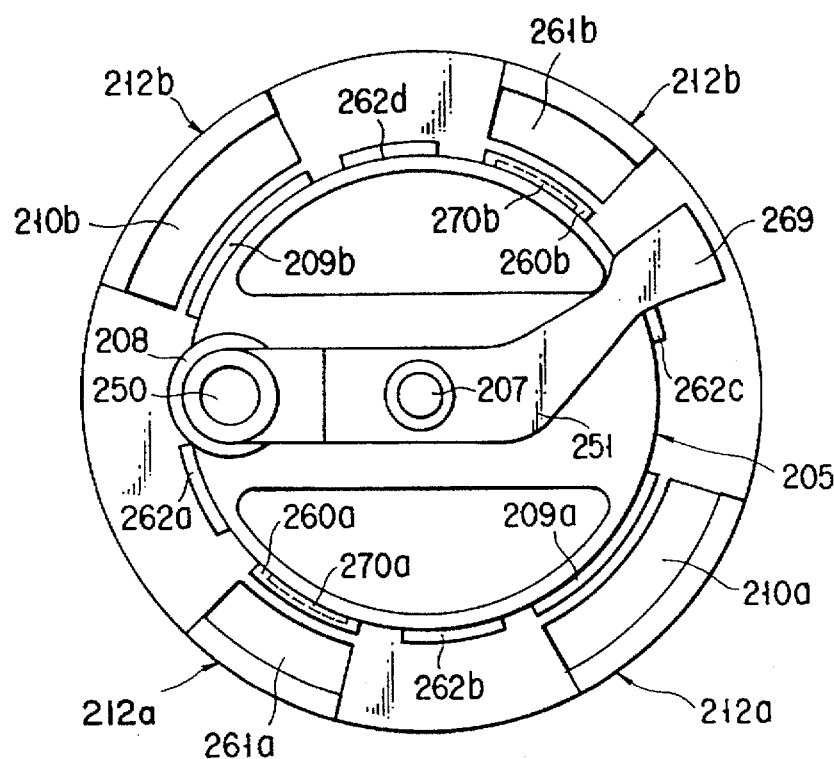
FIG. 16 is a plan view showing the structure of the objective lens drive apparatus according to the fifth embodiment.
Figure 17A:
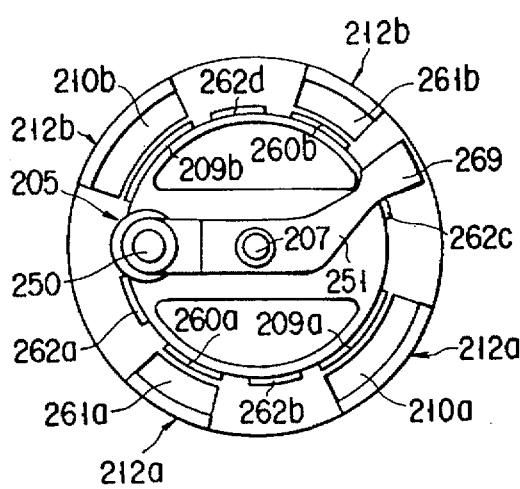
FIGS. 17A to 17F are cross-sections showing the structure of the objective lens drive apparatus according to the sixth embodiment.
Figure 17D:
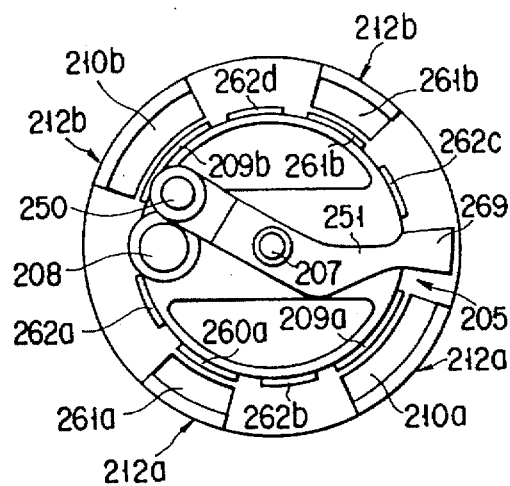

Next, the fifth embodiment of the present invention will be explained with reference to FIGS. 16 to 17F. FIG. 16 is a plan view showing the structure of an objective lens drive apparatus according to the fifth embodiment. FIGS. 17A to 17F are views for explaining operation of the shutter in the objective lens drive apparatus according to the fifth embodiment. Note that those components of the fifth to eighth embodiments described below which are the same as those of FIG. 4 are denoted by the same references, to omit reiteration of explanation thereof.

This embodiment is different from the fourth embodiment in the shape of the shutter 251 and the driving method of the lens holder 205 for switching the shutter 251.

Specifically, only one lever 269 is formed in the shutter 251 of this embodiment, as is shown in FIG. 16, and both sides of this lever 269 respectively collide with magnetic circuits 212a and 212b, thereby performing switching of the second diaphragm portion 250.

At first, a diaphragm control circuit 231 supplies a track control circuit 227 with a control signal, thereby to control tracking coils 260a and 260b to be rendered electrically conductive. Further, the lens holder 205 is rotated beyond a tracking movable range. The lens holder 205 then moves to the position indicated in FIG. 17B from a neutral position indicated in FIG. 17A. In this state, a static friction force from the lens holder 205 is effected on the shutter 251, and integrally rotates, in synchronization with the lens holder 205.

Figure 17B:
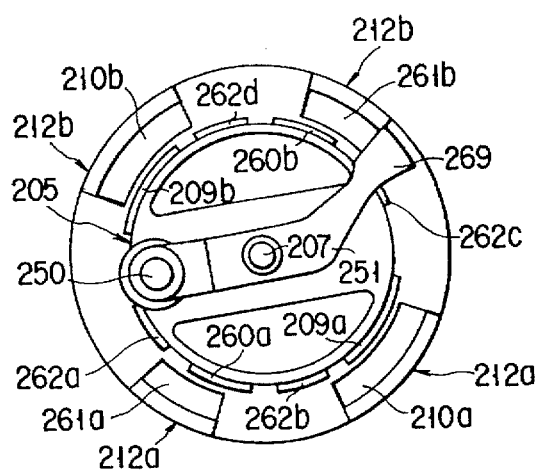
Figure 17E:
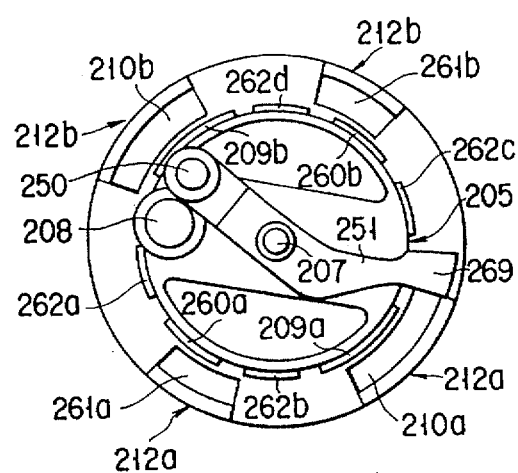

In the state of FIG. 17B, the lever 269 of the shutter 251 collides with a magnetic circuit 212b, so that the shutter 251 cannot rotate anymore.

Figure 17C:
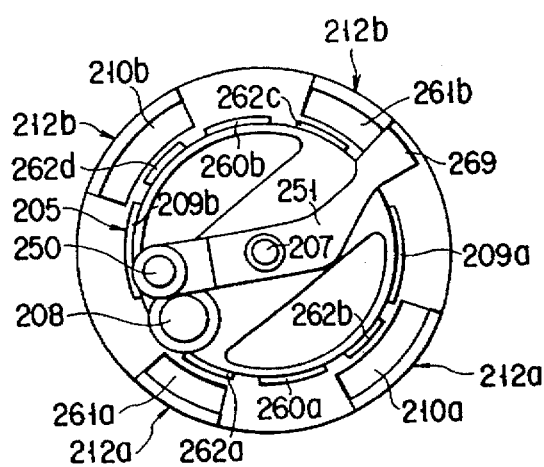
Figure 17F:
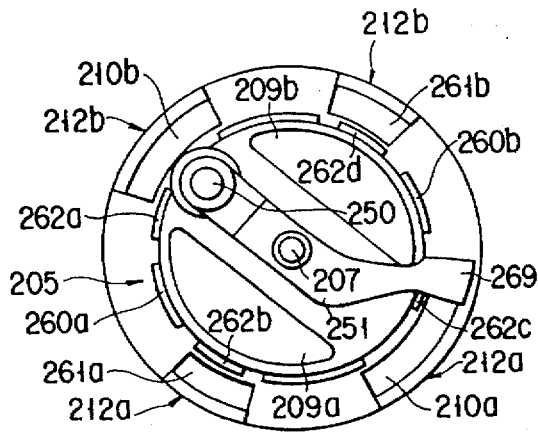

If the lens holder 205 is further rotated from this state, only the lens holder 205 rotates and positions of the shutter 251 and lens holder 205 relative to each other change as shown in FIG. 17C, so that the second diaphragm portion 205 overlapping the objective lens 208 moves.

In this state, in this embodiment, subsidiary coils 262a, 262b, 262c, and 262d which are provided adjacent to the tracking coils 260a and 260b and are just positioned within the magnetic gap are rendered electrically conductive, in place of the tracking coils 260a and 260b far derived from the magnetic gap. In this manners the lens holder 205 is rotated in the reverse direction so that the objective lens 208 can be returned to a neutral position.

Note that subsidiary coils 262a, 262b, 262c, and 262d are controlled to be rendered electrically conductive by a control signal from the diaphragm circuit 231 shown in FIG. 14 described above.

Thus, the shutter 251 and the lens holder 205 are rotated while maintaining their positions relative to each other, and are brought into a state in which only the first diaphragm portion 205d determines the opening of the objective lens 208, as is shown in FIG. 17D.

Note that if the second diaphragm portion 250 is required due to the characteristic of a disc 201 placed, the above operation need not be carried out but control is performed so as to carry out the following operation.

At first, the diaphragm control circuit 231 supplies the track control circuit 227 with a control signal, thereby to control the tracking coils 260a and 260b to be rendered electrically conductive. Further, the lens holder 205 is rotated in the reverse direction beyond the tracking movable range from the state as shown in FIG. 17D. The lens holder 205 then moves to a position indicated in FIG. 17E. In this state, the lens holder 205 also rotates while maintaining its position relative to the shutter 251.

In the state of FIG. 17E, the other end of the lever 269 of the shutter 251 collides with the magnetic circuit 212a, so that the shutter 251 cannot be rotated any more.

If the lens holder 205 is further rotated from this state, only the lens holder 205 is rotated, positions of the shutter 251 and the lens holder 205 relative to each other change, so that the second diaphragm portion arranged apart from the objective lens 208 moves to a state in which the diaphragm portion overlaps the lens.

In this state, subsidiary coils 262a, 262b, 262c, and 262d which are provided adjacent to the tracking coils 260a and 260b and are just positioned within the magnetic gap are rendered electrically conductive, in place of the tracking coils 260a and 260b far derived from the magnetic gap. In this manner, the lens holder 205 is rotated in the reverse direction so that the objective lens 208 can be returned to a neutral position.

Thus, the shutter 251 and the lens holder 205 are rotated while maintaining their positions relative to each other, and are brought into a state in which only the first diaphragm portion 205d determines the opening of the objective lens 208, as is shown in FIG. 17D.

Note that the yokes 211b and 211d standing inside the focus coils 209a and 209b as well as the tracking coils 260a and 260b limit the rotation angle of the lens holder 205, as is shown in FIG. 17C, and serve as a stopper for restricting excessive rotation of the lens holder 205.

In this embodiment, like in the foregoing embodiments, yokes may be provided so as to stand inside the focus coils and tracking coils, thereby limiting the rotation angle of the movable member 205, and so as to serve as a stopper for restricting excessive rotation of the lens holder 205.

However, in this embodiment, subsidiary coils 262a and 262b are controlled to be electrically rendered at appropriate timing, thereby generating a force which cancels the rotation acceleration of the lens holder 205 and securely stopping the lens holder 205.

According to the objective lens drive apparatus of this embodiment which operates in the manner as described above, the numerical aperture can be switched depending on the standard and the specification of a disc, so that it is not necessary to prepare a plurality of specific (individual) objective lens drive apparatuses. Therefore, there is provided an objective lens drive apparatus which alone is capable of performing recording or reproduction of various information.

Although a total four magnetic circuits are used in this embodiment, the same operation as above can also be realized using two magnetic circuits.

(Sixth Embodiment)

Figure 18:
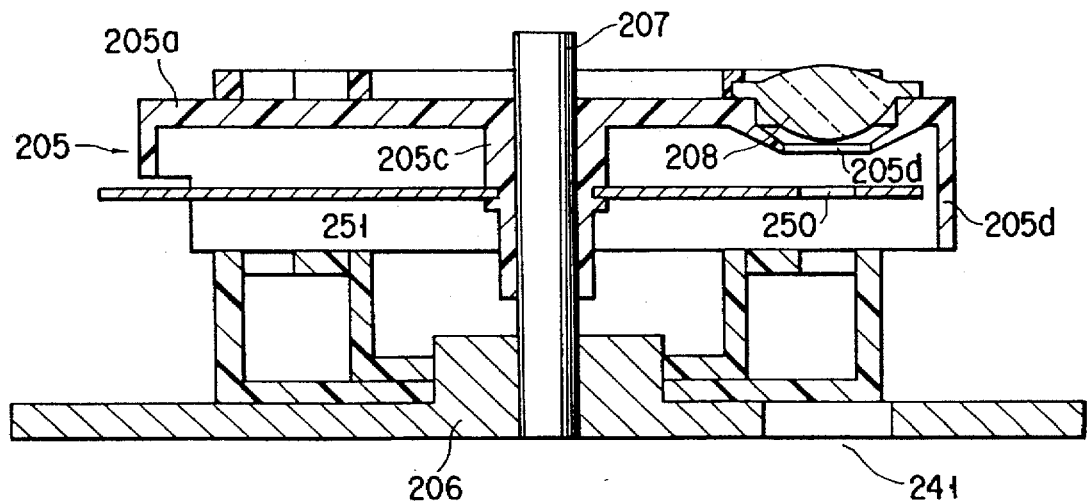
FIG. 18 is a cross-section showing the structure of the objective lens drive apparatus according to the sixth embodiment.

Next, the sixth embodiment of the present invention will be explained with reference to FIG. 18. Here, FIG. 18 is a cross-section showing the structure of the objective lens drive apparatus according to this sixth embodiment.

This embodiment is different from the fourth and fifth embodiments in the installation position of the shutter 251. Specifically, in this embodiment, the shutter 251 is positioned in the side opposite to the disc with respect to the objective lens 208, so that the shutter 251 is just provided inside the lens holder 205.

If this structure is adopted, the second diaphragm portion 2S0 is positioned in the front stage of the first diaphragm portion 205d (i.e., the position close to a light source) even when the shutter 2S1 vibrates due to rotation of the lens holder 20S, for example. Therefore, the state of the opening is not changed, but the recording and/or reproduction of a signal is much more stabilized.

(Seventh Embodiment)

Figure 19:
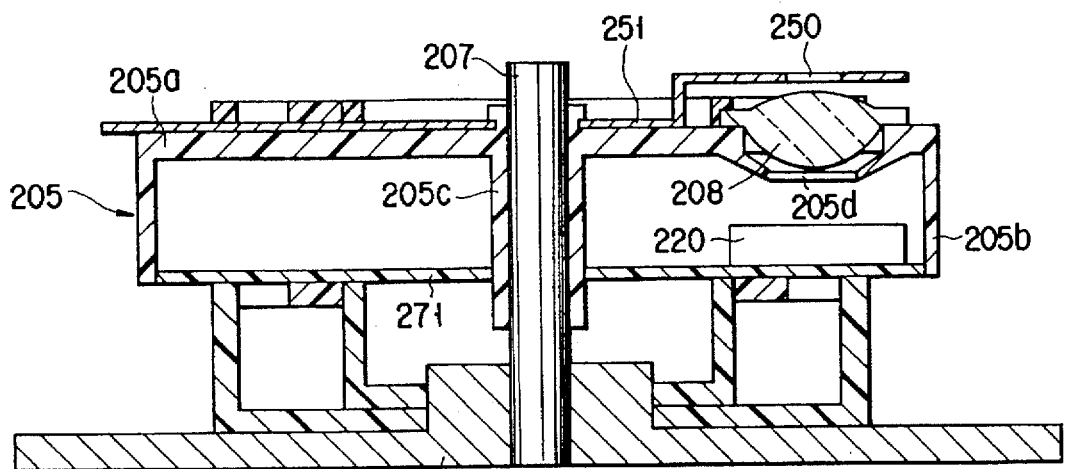
FIG. 19 is a cross-section showing the structure of the seventh embodiment.

Next, the seventh embodiment of the present invention will be explained with reference to FIG. 19. Here, FIG. 19 is a cross-section showing the structure of the objective lens drive apparatus according to the seventh embodiment. This embodiment is different from the fourth to sixth embodiments in that optical elements 220 are internally contained in the lens holder 20S, thereby constituting a closed structure. Specifically, optical elements 220 such as a semiconductor laser 221, and first and second light detectors 22Sa and 22Sb (see FIG. 14) are fixed on a cover 271 fixed to a lower portion of the lens holder 20S, and internal space of the lens holder 20S is closed to be air-tight by the cover 271.

By adopting this structure, the back surface of the objective lens which is difficult to clean is protected from pollution by dust and particles, and the reliability of the apparatus can be ensured for a long period.

(Eighth Embodiment)

Figure 20A:
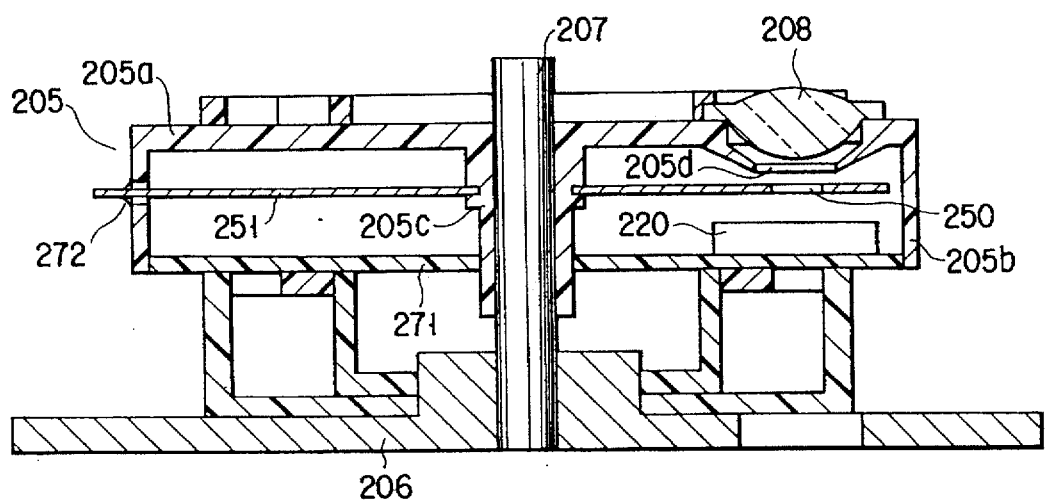
FIGS. 20A and 20B are respectively a cross-section showing the structure of the objective lens drive apparatus according to the eighth embodiment and an enlarged view showing a part of a shutter used in the apparatus.
Figure 20B:
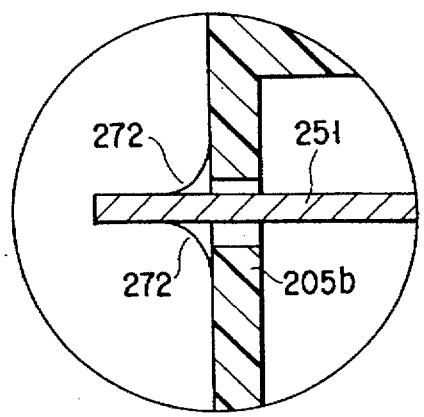

Next, the eighth embodiment of the present invention will be explained with reference to FIGS. 20A and 20B. Here, FIGS. 20A and 20B are a cross-section showing the structure of an objective lens drive apparatus according to the eighth embodiment and an enlarged view showing a part of the shutter used in this apparatus.

This embodiment is characterized in that the shutter 251 and the optical elements 220 are contained inside the lens holder 205, thereby constituting a closed structure. In addition, an elastic protect means 272 (see FIG. 20B) such as sealing rubber for covering a part of the shutter 251 projecting to the outside of the lens holder is provided in the side opposite to the objective lens 208 with respect to the rotation shaft 207 as the center (i.e., in the left side of FIG.

20A). The internal space of the lens holder 205 is kept closed by the elastic protect means 272. If an appropriate friction force is simultaneously effected between the elastic protect means 272 and the shutter 251, the position of the shutter 251 can be maintained.

Although the fourth to eighth embodiments described above show an objective lens drive apparatus using one kind of objective lenses, a plurality of objective lenses having different optical characteristics may be fixed on both sides of the lens holder 205 with the rotation shaft 207 positioned as the center, and diaphragm portions may respectively be provided for these objective lenses. In this structure, it is possible to select an objective lens having spherical aberration in accordance with the thickness of the disc substrate inserted, at first, and to select a diaphragm portion, in accordance with the spot diameter formed on the disc, in the next. Therefore, an objective lens drive apparatus is provided which alone performs recording or reproducing of information with respect to optical discs and magneto-optical-magnetic discs.

Although the above fourth to eighth embodiments show an objective lens drive apparatus comprising two diaphragm portions, three or more diaphragm portions can be prepared if necessary. In this case, it is desirable that only the diaphragm portion having the largest opening is fixed and the other diaphragm portions are disposed in the order from the diaphragm portion having the larger numerical aperture.
(Ninth Embodiment)

Figure 21:
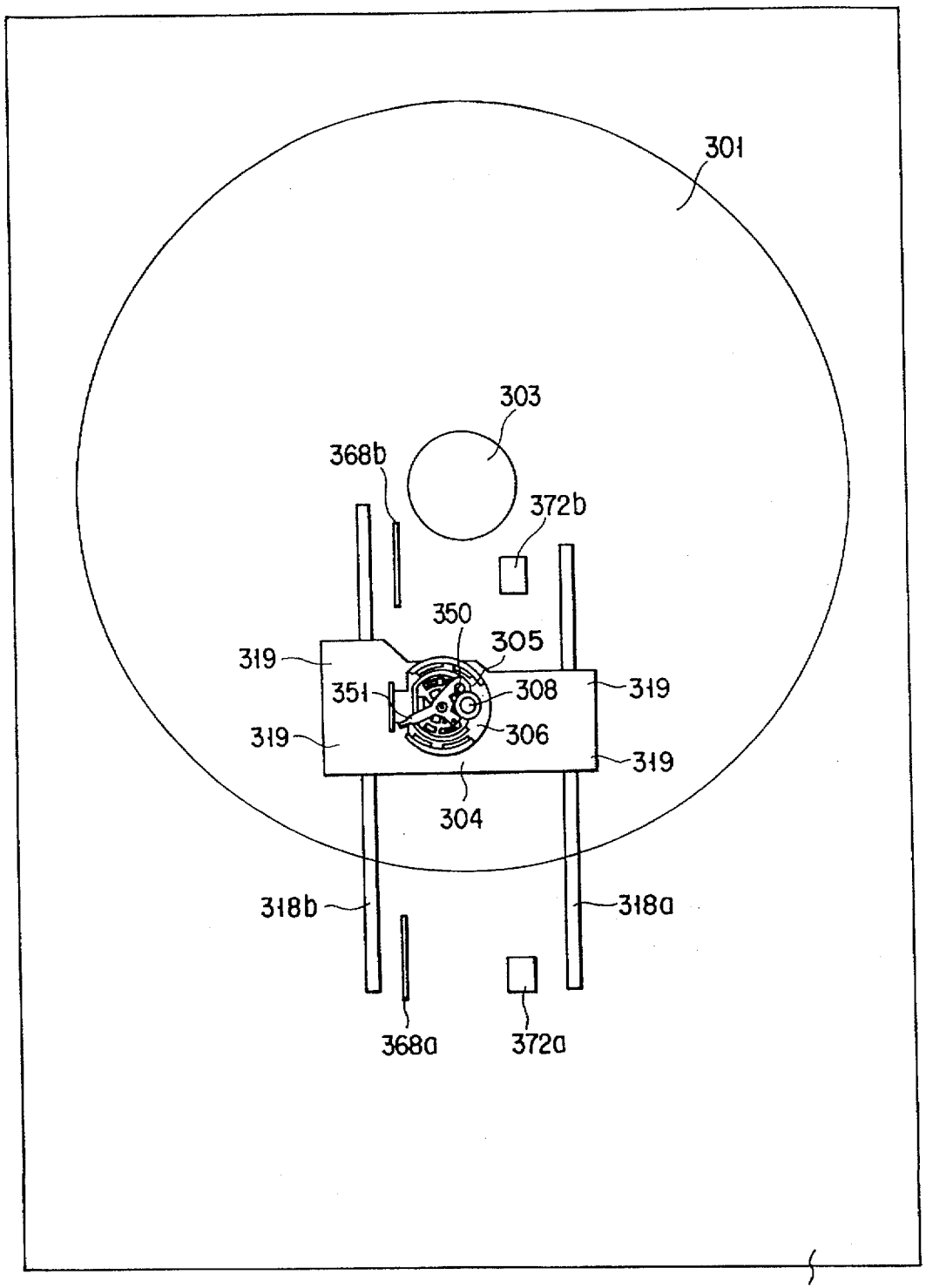
FIG. 21 is a plan view showing the entire structure of an optical disc apparatus incorporating an objective lens drive apparatus according to ninth to tenth embodiments of the present invention.
Figure 22:
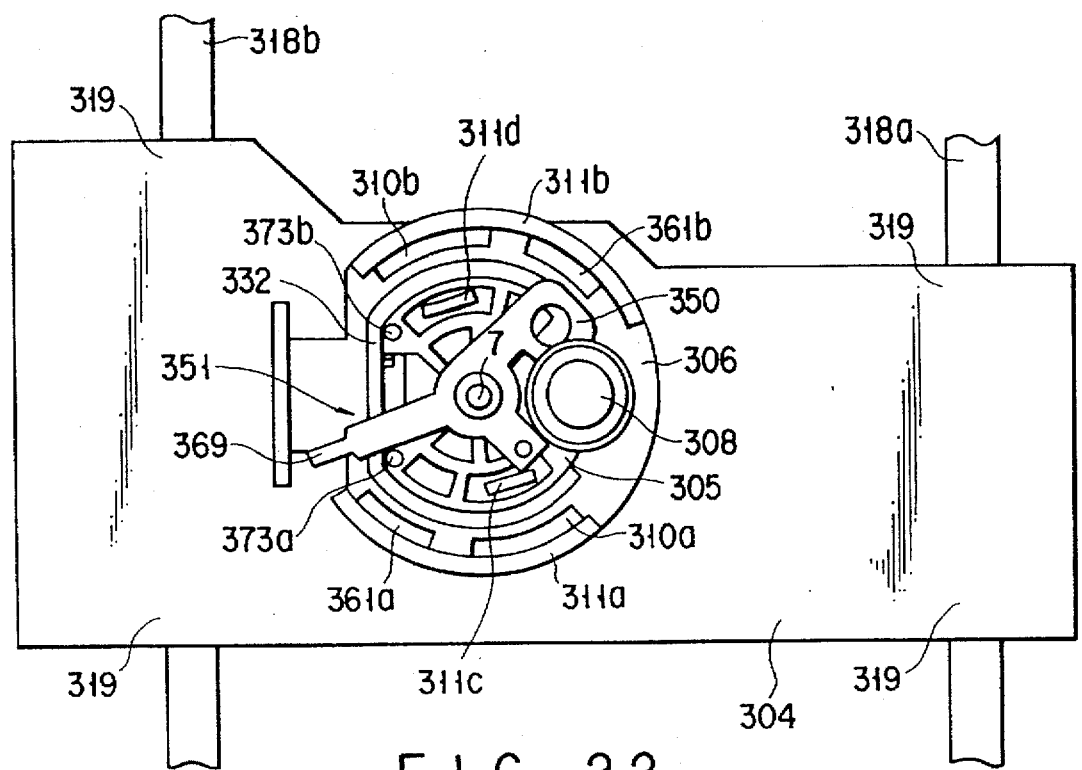
FIG. 22 is a plan view showing a structure of an objective lens drive apparatus according to the ninth embodiment.
Figure 23:
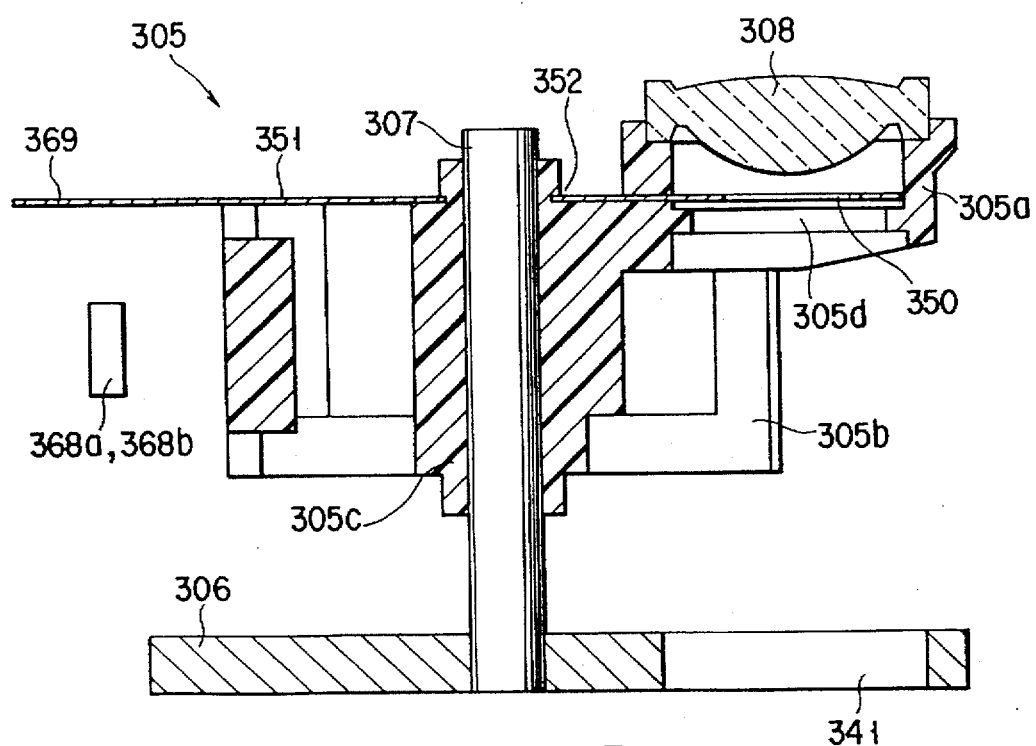
FIG. 23 is a cross-section showing a movable member (or a lens holder) in the objecting lens drive apparatus shown in FIG. 22.
Figure 29:
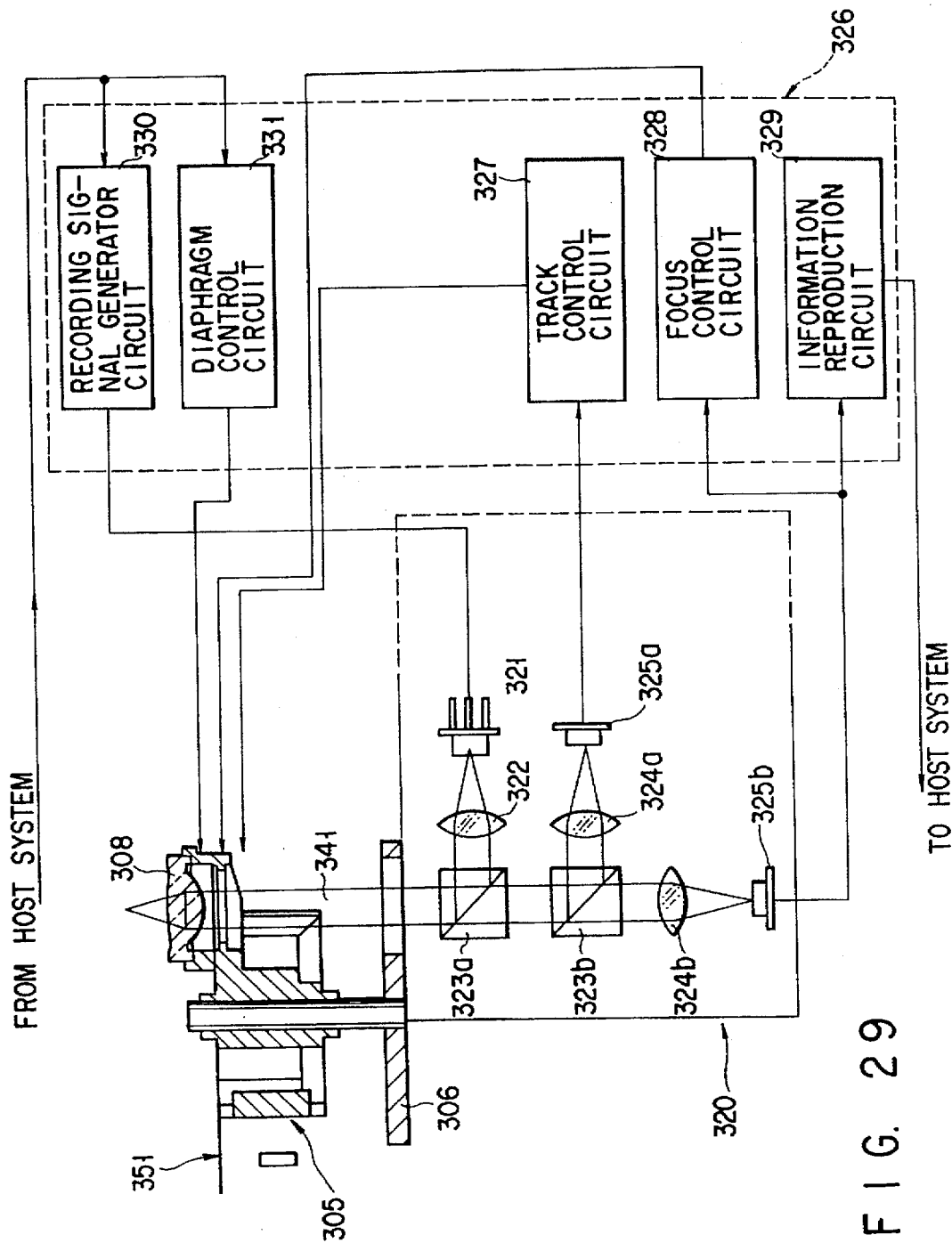
FIG. 29 is a view showing an optical processing system and a signal processing system of the optical disc apparatus shown in FIG. 21.

Next, the ninth embodiment of the present invention will be explained with reference to FIGS. 21 to 31E. Here, FIG. 21 is a plan view showing the entire structure of the optical disc apparatus mounting an objective lens apparatus according to the ninth embodiment (this figure will be referred to in the following explanation of the tenth embodiment). FIG. 22 is a plan view showing the structure of the objective lens drive apparatus according to this embodiment. FIG. 23 is a cross-section showing the structure or a lens holder in the objective lens drive apparatus. FIG. 24 is a side view showing the structure of the lens holder shown in FIG. 22. FIG. 25 is a plan view showing the structure of the lens holder shown in FIG. 22. FIG. 26 is a plan view showing the structure of the shutter shown in FIG. 22. FIG. 27 is a cross-section showing the structure of the magnetic circuit for driving the lens holder shown in FIG. 23. FIG. 28 is a plan view showing the structure of the coil unit provided opposite to the magnetic circuit shown in FIG. 27. FIG. 29 is a view showing the structure of the optical processing system and the signal processing system of the optical disc apparatus shown in FIG. 21. FIGS. 30A to 30E are views for explaining the inserting operation of the shutter in the objective lens drive apparatus according to this embodiment. FIGS. 31A to 31E are views for explaining the excluding operation of the shutter in the objective lens drive apparatus according to this embodiment.

A disc 301 (e.g., an optical disc, an magneto-optical-magnetic disc, or the like) which is used for recording and/or reproducing information is held on a spindle motor 303 fixed on a base 302, by a chucking means such as a magnet chuck or the like. The disc is stably rotated by a spindle motor 303 when recording or reproducing information.

A carriage 304 is provided close to a lower portion of the disc 303. A movable member (or a lens holder) 305 is mounted on the carriage 304. As will be described later, the lens holder 305 is supported so as to be movable in the diameter direction and in the thickness direction of the disc 301.

As shown in FIGS. 23 to 25, the lens holder 305 is provided with a lens attaching portion 305a, and a cylindrical bobbin 305b on which the lens attaching portion 305a is fixed. In addition, a slide bearing 305c is provided in the center of the coil bobbin 305a.

A rotation shaft 307 having an end fixed and standing on a magnetic circuit base 306 is inserted and engaged in the slide bearing 3OSc with a slight clearance (of 10 microns or less), thereby constituting a slide bearing mechanism (or a shaft slide mechanism). Further, the lens holder 305 is capable of rotating around the rotation shaft 307 and of moving in parallel in the axial direction.

An objective lens 308 is fixed on the lens attaching portion 305a, and a first diaphragm portion 305d which determines the first numerical aperture (e.g., 0.6) of the objective lens 308 is provided for the lens holder 305 (at a lower portion of the objective lens 308). Note that a notch 305e in which a shutter 351 described later is inserted is formed between the lens attaching portion 305a and the first diaphragm portion 305d.

In FIG. 23, the structure is designed such that a clearance of 1 mm or more is formed between the shutter 3S1 and the projecting portions 368a and 368b.

A coil unit 332 made of a flexible print board as shown in FIG. 28 is attached onto the side of the coil bobbin 305b. On the coil unit 332, rectangular focus coils 309a and 309b and tracking coils 360a and 360b are formed. In a state in which the coil unit 332 is wound around the side surface of the coil bobbin 305b, it is designed that the focus coils 309a and 309b are respectively positioned to be symmetrical with the tracking coils 360a and 360b, with respect to the rotation shaft 307. Note that a lead line for supplying a current from outside to the focus coils 309a and 309b and the tracking coils 360a and 360b will be omitted from FIG. 28.

Further, magnetic circuits which are constituted by permanent magnets 310a, 310b, 361a, and 361b as well as yokes 311a, 311b, 311c, and 311d are provided on the magnetic circuit base 306 at positions symmetrical with each other, with respect to the rotation shaft 307. In the state shown in FIG. 22, the focus coils 309a and 309b as well as the tracking coils 360a and 360b are interposed between the permanent magnets 310a and 310b and the yokes 311c and 311d, and the tracking coils 360a and 360b oppose the permanent magnets 361a and 361b. The focusing coils 309a and 309b are arranged so as to oppose the permanent magnets 310a and 310b with a magnetic gap of a predetermined length inserted therebetween, as well as the permanent magnets 361a and 361b are arranged so as to oppose the permanent magnets 361a and 361b with a magnetic gap of a predetermined length inserted therebetween, too. Further, the permanent magnets 310a and 310b apply a magnetic field to the focusing coils 309a and 309b, as well as the permanent magnets 361a and 361b apply a magnetic field to the tracking coils 360a and 360b.

As will be apparent from FIG. 22, there are provided yokes 311c and 311d specific to the focusing coils 309a and 309b, but yokes specific to the tracking coils 360a and 360b are not particularly provided. This structure is designed because yokes 311c and 311d must be provided to concentrate the flow of magnetic flux in order to increase the drive force in the focus direction while some margin is included in the driving force in the tracking direction. Therefore, there will be no problem if yokes specific to tracking coils 360a and 360b are provided if necessary.

In addition, yokes 311a and 311b forming part of the magnet circuits 112a and 112b are fixed on the magnetic base 306 by means of welding, caulking, or the like, and are arranged to be inserted and stand in a hole provided in the lens holder 305.

Further, as is shown in FIG. 27, the permanent magnets 310a and 310b have a magnetic direction perpendicular to the axial direction of the rotation shaft 307, and are magnetized in directions opposite to each other from their division line equal to the axial direction situated as the boundary therebetween. The magnetic direction of the permanent magnets 361a and 361b is perpendicular to the magnetic direction of the permanent magnets 310a and 310b, and are magnetized in directions opposite to each other from their division line perpendicular to the axial direction as the boundary.

Then, the focus coils 309a and 309b are rendered electrically conductive, and are simultaneously applied with magnetic flux by the permanent magnets 310a and 310b, thereby generating a Lorentz force, so that the lens holder 305 is driven to cause a fine parallel movement in the thickness direction of the disc 301 (or the axial direction of the rotation shaft 307). In addition, the tracking coils 360a and 360b are rendered electrically conductive and are simultaneously applied with magnetic flux by the permanent magnets 361a and 361b, thereby causing a Lorentz force, so that the lens holder 305 is driven to make a fine parallel movement in the radial direction of the disc 301 (around the rotation shaft 307).

In positions apart from each other by 180° around the coil bobbin 305b, two sheets of magnetic members 370a and 370b made of iron pieces or the likes are respectively provided in the center of the tracking coils 360a and 360b (i.e., in the hollow portions of these wound coils), as is shown in FIG. 25. These two magnetic members 370a and 370b are stuck on positions which are symmetrical with each other with respect to the rotation shaft 307. When one of the objective lenses 308 exists within a light path 341 (e.g., a space), these positioning magnetic members 370a and 370b are positioned that these members just oppose to the permanent magnets 361a and 361b.

Also, as is shown in FIG. 23, a shutter 351 on which a second diaphragm portion 350 set to have an opening smaller than the first diaphragm portion 305d, e.g., a numerical aperture (NA) of 0.3 is fixed is rotatably installed around the magnetic circuit base 306 through the rotation bearing 352. This shutter 351 is rotated around the rotation shaft 307, and is inserted into the notch 305e between the lens attaching portion 305a and the first diaphragm portion 305d. Therefore, the second diaphragm portion 350 is inserted into or excluded from a light path of a laser beam LB including an objective lens 308.

The shutter 351 is made of a non-magnetic spring material such as phosphor bronze, engineer plastic, SUS, or the like. Further, as shown in FIG. 26, a rotation bearing portion 352, a projecting portion 353, and a lever 369 are formed which are engaged with a slide bearing 305c.

The rotation bearing portion 352 is formed in a position substantially corresponding to the center of gravity of the shutter 351.

The lever 369 is a portion for transmitting a driving force to rotate the shutter 351, and is formed in the side opposite to second diaphragm portion 350 with the rotation center (or the rotation bearing portion 352) being interposed therebetween.

The projecting portion 353 provided in the vicinity of the rotation bearing 352 is used to maintain the positions of the second diaphragm portion 350 where the second diaphragm portion 350 is inserted in the light path 341 and is excluded therefrom. This projecting portion has a shape projecting in the thickness direction of the paper of FIG. 26 so that the projecting portion is engaged with two concave portions not shown. Here, the shutter 351 is slightly bent in the thickness direction within its elasticity range, and the restoring force thereof makes a pressing force to act on the concave portions, so that a secure engagement is realized between the projecting portion and the concave portions, thereby preventing positional dislocation of the diaphragm.

As shown in FIGS. 22 and 25, the movable range of the shutter 351 is restricted by two lever stoppers 373a and 373b projected from the lens holder 305.

Meanwhile, a rack (or a line of gears) not shown is installed in both ends of the carriage 304, and this rack is driven by a feed motor incorporating a pinion (gear) not shown, so that the carriage 304 can be moved from the innermost periphery to the outermost periphery of the disc. Here, slide bearings 319 are respectively provided at both the left and right ends of the carriage, and two guide rails 318a and 318b are arranged in parallel with each other, in a relation that the two guide rails 318a and 318b are inserted in the slide bearings 319. Specifically, the carriage 304 is supported along the guide rails 318a and 318b, such that the carriage can be moved by the feed motor.

As shown in FIG. 21, a mechanism (e.g., guide rails 318a and 318b) for moving the carriage 304 in the radial direction of the disc 301 has a movement length which allows the objective lens 308 mounted on the carriage 304 to be moved much outer than the outermost periphery of the recording area of the disc 301. Then, where the carriage 304 is moved much outer than the outermost periphery of the disc 301, the first projecting portion (or engaging member) fixed on the base 302 can be engaged with the lever 369 of the shutter 351, and inserting operation of the second diaphragm portion 350 can be performed in the procedures described later.

In addition, where the carriage 304 is moved to be much inner than the innermost periphery of the disc 301, the second projecting portion (or the engaging member) 368b fixed on the base 302 can be engaged with the lever 369 of the shutter 351, and excluding operation of the second diaphragm portion can be performed in the procedures described later.

Since the shutter 351 is a non-magnetic spring material such as phosphor bronze, engineer plastic, SUS, or the like stainless or the like, a restoring force generated by elastic deformation of the spring member causes a friction force against the lens holder 305, thereby serving as a mechanism for maintaining the position of the second diaphragm portion 350.

Next, the optical system and the signal processing system of the optical disc apparatus will be explained with reference to FIG. 29. A laser beam LB to be irradiated on the disc 301 is generated by an optical unit 320 which is fixed on a lower portion of the lens holder 305 and is integrally movable together with the carriage. A laser beam LB irradiated from a semiconductor laser 321 in the optical unit 320 is converted into a parallel beam through a collimator lens 322, and is bent by 90° by a first beam splitter 323a, thus being introduced into the carriage 304 from the radial direction of the disc 301. A light path 341 (e.g., a space) for introducing the laser beam LB is provided at the bottom of the carriage 304, and the laser beam LB is injected into the objective lens 308 through the light path 341. The laser beam LB injected into the objective lens 308 is supplied with predetermined convergence, so that the laser beam is focused onto an information storage surface of a disc 301.

When the system is in a state where information is recorded, a laser beam LB introduced to the disc 301 is subjected to intensity modulation in correspondence with information recorded on the information recording surface, i.e., in correspondence with presence or absence of a fine pit. Thereafter, the laser beam LB is repeated to the objective lens 308, again. The reflected laser beam LB is introduced again to a fixed optical unit 320 through the light path 341. The light beam then pass through the first beam splitter 323a, and is then divided by a second beam splitter 323b into two paths, and the divided beams respectively form images on first and second light detectors 325a and 325b through focusing lenses 324a and 324b, respectively.

Each of the reflected laser beams LB introduced into the light detectors 325a and 325b is converted into an electric signal corresponding to the size of a beam spot, and is supplied to a track control circuit 327 and focus control circuit 328 provided in a control portion 326. Signals generated in these track control circuit 327 and the focus control circuit 328 are used as a focus offset signal and a track offset signal for the objective lens 308, to control the focus direction and the track direction.

By thus using focus offset signals and track offset signals, a dislocation of the objective lens 308 in the focus direction (i.e., a focus dislocation) is detected, and current values supplied to the focus coils 309a and 309b are controlled so as to correct the positional dislocation. In addition, a positional dislocation of the objective lens 308 is detected by using the track offset signal, and current values supplied to the tracking coils 360a and 360b are controlled so as to correct the positional dislocation.

In addition, the reflected laser beam LB introduced to the second light detector 325b is also supplied to an information reproduction circuit 329. This information may be of various information recorded on the disc 301, which is sent to a host system not shown (e.g., a personal computer or the like) and is outputted as a character, a static image, or a moving image through a display, or as music or a voice through a loud speaker. In this case, the carriage 304 follows the track on the information recording surface of the disc 301, and the movement thereof is controlled in the radial direction by large driving or fine driving.

Note that the control portion 326 includes a recording signal generator circuit 330 which generates a recording signal in accordance with information inputted from an external host system not shown (e.g., a personal computer or the like), and a diaphragm control circuit 331 which generates a signal for controlling rotation of the shutter 351 in order to locate the second diaphragm portion 350 within the light path of the laser beam LB described above.

Next, switching control of the second diaphragm portion 350 will be explained below.

The disc 301 which can be used in the objective lens drive apparatus of this embodiment is not limited to only one kind of disc, unlike a conventional apparatus, but it is possible to use a plurality of kinds of discs according to different standards, e.g., discs having different disc recording densities, different curvature tolerances, different disc substrate thicknesses, and the like. For example, not only a CD-ROM disc, but also an MO disc and a PC disc can be used. Further, two diaphragm portions 305d and 350 used in this embodiment are prepared so as to comply with processing of a usable disc.

For example, in the case of using a disc which requires a reduction in spot diameter of a laser beam LB, the second diaphragm portion 350 is detached thereby performing such operation in which the first diaphragm portion 305d determines the effective light flux diameter thereby increasing the numerical aperture. In the case of using a disc which requires an increase in spot diameter of a laser beam LB, the second diaphragm portion 350 is inserted so that operation of reducing the numerical aperture is performed.

A user places a desired disc 301 on a spindle motor 303, and inputs the kind of the disc 301 (such a CD-ROM disc or a PC disc which is information as a disc of a different standard) from a host system (e.g., from a personal computer or the like). A signal thus inputted is sent to a diaphragm control circuit 331, and control is performed such that the second diaphragm portion 350 is moved to a predetermined position, in correspondence with the light path 341 of the laser beam LB.

In this embodiment, control of rotation driving is performed when switching the position of the second diaphragm 350. The sequence of control of the rotation driving will be explained with reference to FIGS. 30A to 31E.

Supposing that a state in which the second diaphragm portion 350 is not inserted in the light path 341, an instruction of inserting the second diaphragm portion 350 into the light path 341 is outputted from the diaphragm control circuit 331. Upon receipt of this output signal, the focus coils 309a and 309b are rendered electrically conductive, and then, the lens holder 305 moves in the direction extending apart from the surface of the disc 301 beyond the range required for normal focus operation. Further, focus positioning is performed in such a positional relation in which the lens holder 305 falls down thereby making projecting portions 368a and 368b overlapped on each other. Further, in this state, the tracking coils 360a and 360b are rendered electrically conductive, and the carriage 304 mounting the lens holder 305 moves to the outer peripheral side of the disc 301. Then, the first projecting portion 368a provided so as to project from the vicinity of the outer peripheral position of the disc 301 just has a contact with the lever 369 (see FIG. 30A).

Figure 30A:
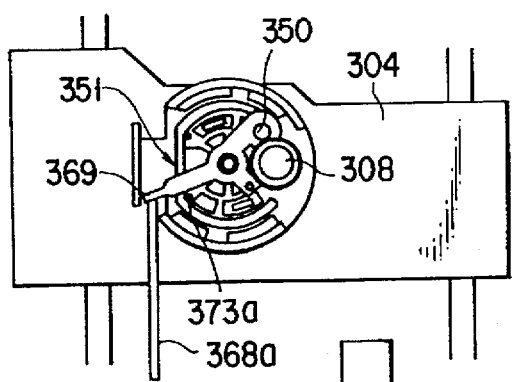
FIGS. 30A to 30E are views for explaining shutter inserting operation in the objective lens drive apparatus according to the ninth embodiment.
Figure 30D:
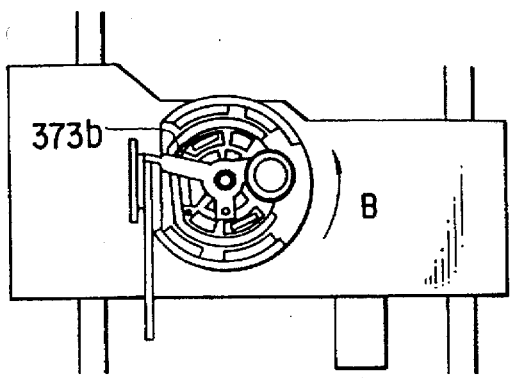
Figure 30B:
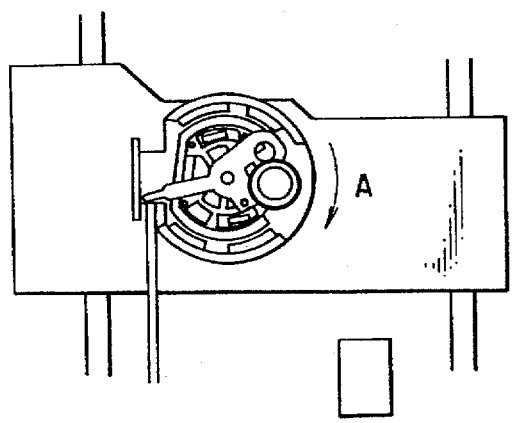

When the carriage 304 is further moved toward the outer periphery of the disc 301 from this state, the shutter 351 is rotated and moves in the direction A by means of the lever 369 in contact with the first projecting portion 368a. In this state, since the shutter 351 and the lens holder 305 are engaged with each other, the lens holder 305 rotates by the same rotation amount in accordance with rotation of the shutter 351. However, since the yokes 311a and 311b are inserted in the hole, the lens holder 305 is rotated by a predetermined amount and thereafter, the rotation of the lens holder 305 is stopped (FIG. 30B).

If the carriage 304 is further moved toward the outer periphery of the disc 1 from this state, only the shutter 351 continues its rotation movement with respect to the lens holder 305, and a part of the second diaphragm portion 350 enters below the objective lens 308 (i.e., into the light path 341).

Figure 30E:
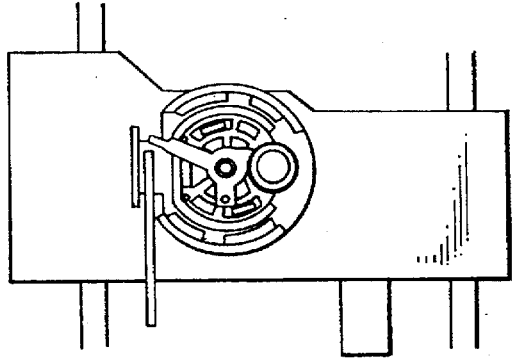
Figure 30C:
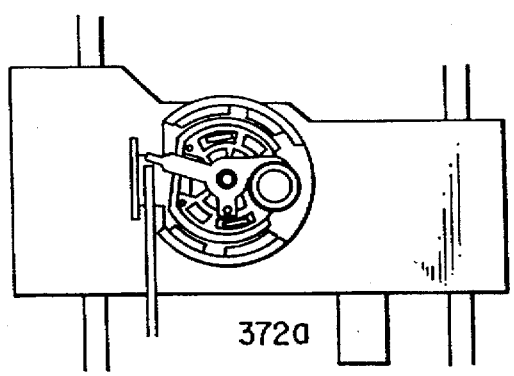

In a state in which a part of the second diaphragm portion 350 enters into the light path 341, the movement of the carriage 304 is restricted by the first carriage stopper 372a (FIG. 30C).

In this state, the tracking coils 360a and 360b are rendered conductive by a signal from the diaphragm control circuit 331, thereby generating a torque in the direction B opposite to the direction A. Due to restriction by the rotation projecting portion 368a of the shutter 351, only the lens holder 305 rotates until the lever 369 is brought into contact with the rubber stopper 373b, and as a result, the lens holder 305 of the second diaphragm portion 350 completely enters right below the objective lens 308 (i.e., into the light path 341). (See FIG. 30D.)

Here, electric conductance of the tracking coils 360a and 360b is stopped. Further, electric conductance of the focus coils 309a and 309b is stopped, and the lens holder 305 is raised. Focus positioning is performed to reach the state of FIG. 23. In this manner, inserting operation of the second diaphragm portion 350 is completed (FIG. 30E).

Meanwhile, supposing that the state in which the second diaphragm portion 350 is not inserted in the light path 341, an instruction of excluding the second diaphragm portion 350 is outputted from the diaphragm control circuit 331, at first. Upon receipt of this output signal, the focus coils 309a and 309b are rendered electrically conductive, and then, the lens holder 305 moves in the direction extending apart from the surface of the disc 301 beyond the range required for normal focus operation, thereby performing focus positioning. Further, in this state, the tracking coils 360a and 360b are rendered electrically conductive, and the carriage 304 mounting the lens holder 305 moves toward the inner peripheral side of the disc 301. Then, the second projecting portion 368 provided so as to stand in the vicinity of the inner peripheral position of the disc 301 is just brought into contact with the lever 369 (see FIG. 31A).

Figure 31A:
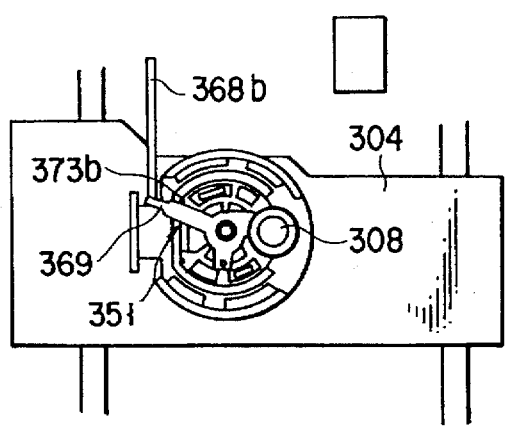
FIGS. 31A to 31E are views for explaining shutter exhausting operation in the objective lens drive apparatus according to the ninth embodiment.
Figure 31D:
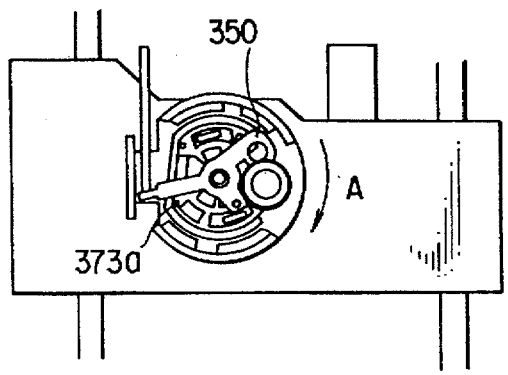
Figure 31B:
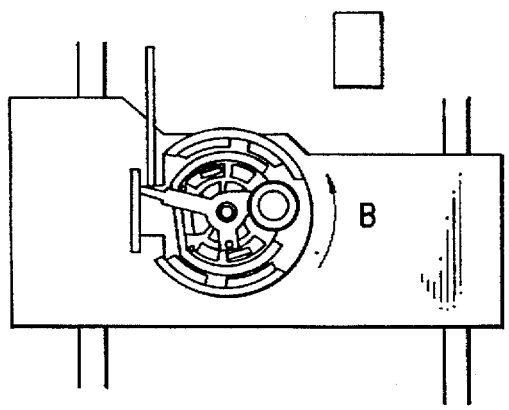

When the carriage 304 is further moved toward the inner periphery of the disc 301 from this state, the shutter 351 is rotated and moves in the direction B by means of the lever 369 in contact with the first projecting portion 368b. In this state, since the shutter 351 and the lens holder 305 are engaged with each other, the lens holder 305 rotates by the same rotation amount in accordance with rotation of the shutter 351. However, since the rotation range of the lens holder 305 is restricted by the yokes 311a and 311b (i.e., since the yokes 311a and 311b are in the hole), the lens holder 305 is rotated by a predetermined amount and thereafter, the rotation of the lens holder 305 is stopped (FIG. 31B)

If the carriage 304 is further moved toward the inner periphery of the disc 301 from this state, only the shutter 351 continues its rotation movement with respect to the lens holder 305, and a part of the second diaphragm portion 350 enters below the objective lens 308 (i.e., into the light path 341).

Figure 31E:
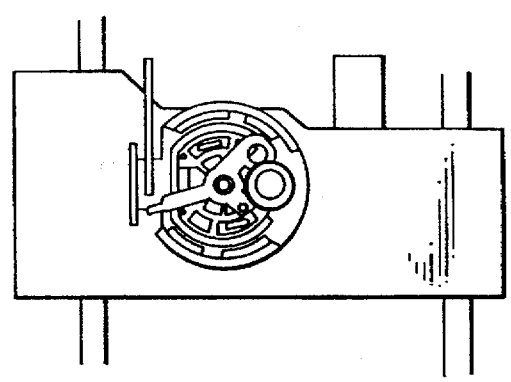
Figure 31C:
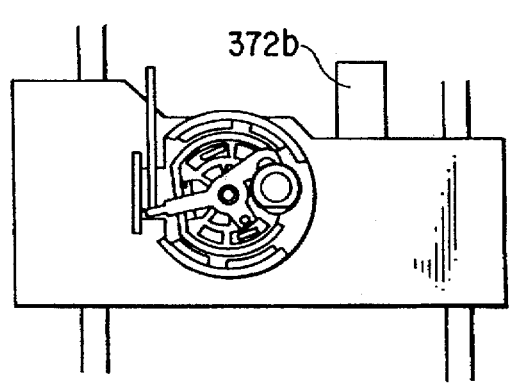

In a state in which a part of the second diaphragm portion 350 is out of the light path 341, the movement of the carriage 304 is restricted by the first carriage stopper 372a (FIG. 31C).

In this state, the tracking coils 360a and 360b are rendered conductive by a signal from the diaphragm control circuit 331, thereby generating a torque in the direction A opposite to the direction B. Since the rotation of the shutter 351 is restricted by the rotation projecting portion 368a of the shutter 351, only the lens holder 305 rotates until the lever 369 is brought into contact with the rubber stopper 373b, and as a result, the second diaphragm portion 350 is completely excluded from under the objective lens 308 (i.e., from inside the light path 341). (See FIG. 31D.)

Here, electric conductance of the tracking coils 360a and 360b is stopped. Further, electric conductance of the focus coils 309a and 309b is stopped, and the lens holder 305 is raised. Focus positioning is performed as described above. Thus, excluding operation of the second diaphragm portion 350 is completed (FIG. 31E).

The objective lens drive apparatus of this embodiment which operates in the manner as described above can be used while switching the numerical aperture depending on the standard and the specification of a disc, so that it is not necessary to prepare a plurality of specific (individual) objective lens drive apparatuses. Therefore, there is provided an objective lens drive apparatus which alone is capable of performing recording or reproduction of various information.

In addition, this embodiment is arranged such that the first diaphragm portion 305d having a large numerical aperture is fixed on a lower portion of the objective lens 308, and the second diaphragm portion 350 having a small numerical aperture can be inserted into and/or excluded from the light path 341. Therefore, when a margin for aberration is optically small, i.e., when the spot diameter of a laser beam LB irradiated onto the disc 301 is small, it is possible to restrict aberration to be caused to a small value even if the objective lens 308 is moved in the tracking direction. Thus, excellent recording and reproduction of signals can be realized.

Further, since the shutter 351 having the second diaphragm portion 350 has a structure in which the center of rotation is substantially equal to the center of gravity, the second diaphragm portion 350 does not derive from the light path but constantly stable recording and reproduction can be realized even under influence of acceleration which occurs when the carriage 304 is moved at a high speed or which is caused due to impacts applied from outside.

Also, the engagement between the lever stopper 373a and 373b and the lever 369 according to the positioning operation of the second diaphragm portion 350 is attained by electric conductance to the tracking coils 360a and 360b. Therefore, the lever 369 does not receive an excessive mechanical force, so that there is no possibility that the shutter 351 may be broken.

Furthermore, since this structure is arranged such that focus positioning must be performed for temporarily moving down the lens holder 305 in order to make the projecting portions 368a and 368b in contact with the lever 369. Therefore, there is no possibility that the shutter 351 may be erroneously inserted and/or excluded when performing normal recording and/or reproducing operation (i.e., operation performed without moving down the lens holder 305). Movement is controlled in the direction in which the lens holder 305 is moved down, i.e., in the direction in which the objective lens 308 and the disc 301 are moved apart from each other. Collision of the objective lens 308 with the disc 301 can be prevented. Of course, if the structure is arranged such that the lens holder 305 can be moved sufficiently inner than the innermost periphery of the recording area of the disc 301 and sufficiently outer than the outermost periphery thereof, recording and/or reproduction operation is not influenced even when the projecting portions 368a and 368b are brought into contact with the lever 369 without moving down the lens holder 305.

(Tenth Embodiment)

Figure 32:
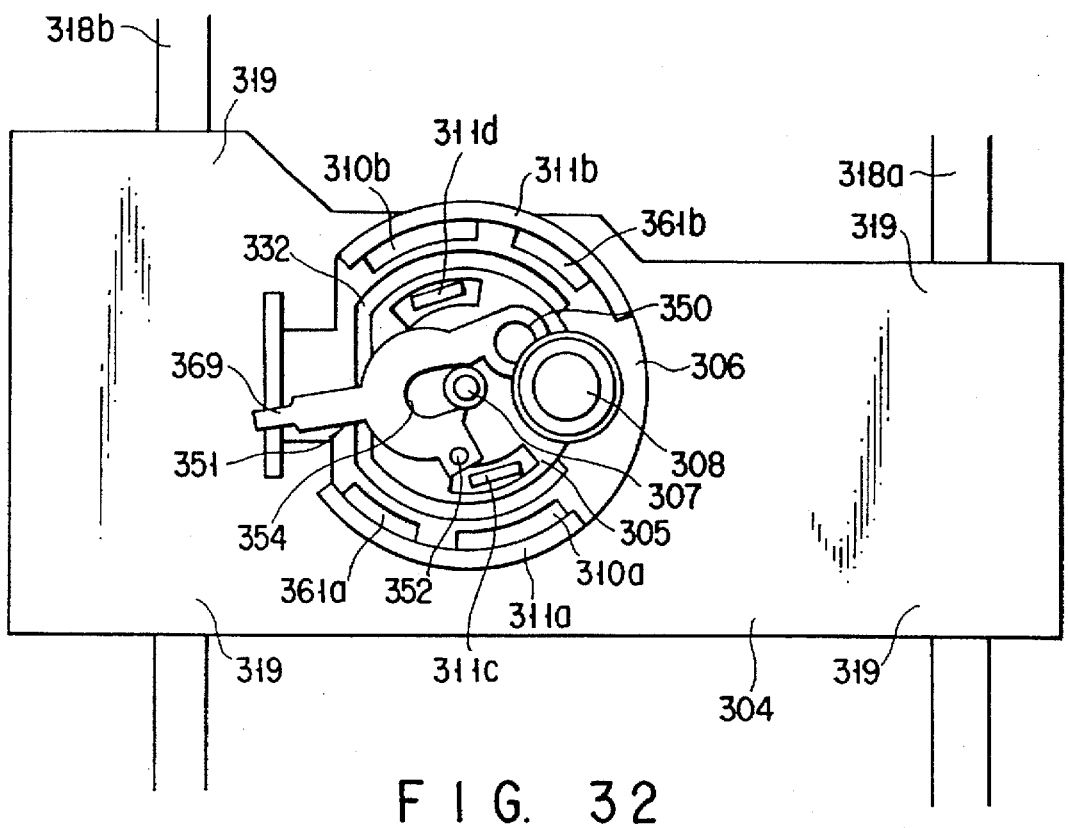
FIG. 32 is a plan view showing a structure of the objective lens drive apparatus according to the tenth embodiment in a state when the shutter is exhausted.
Figure 33:
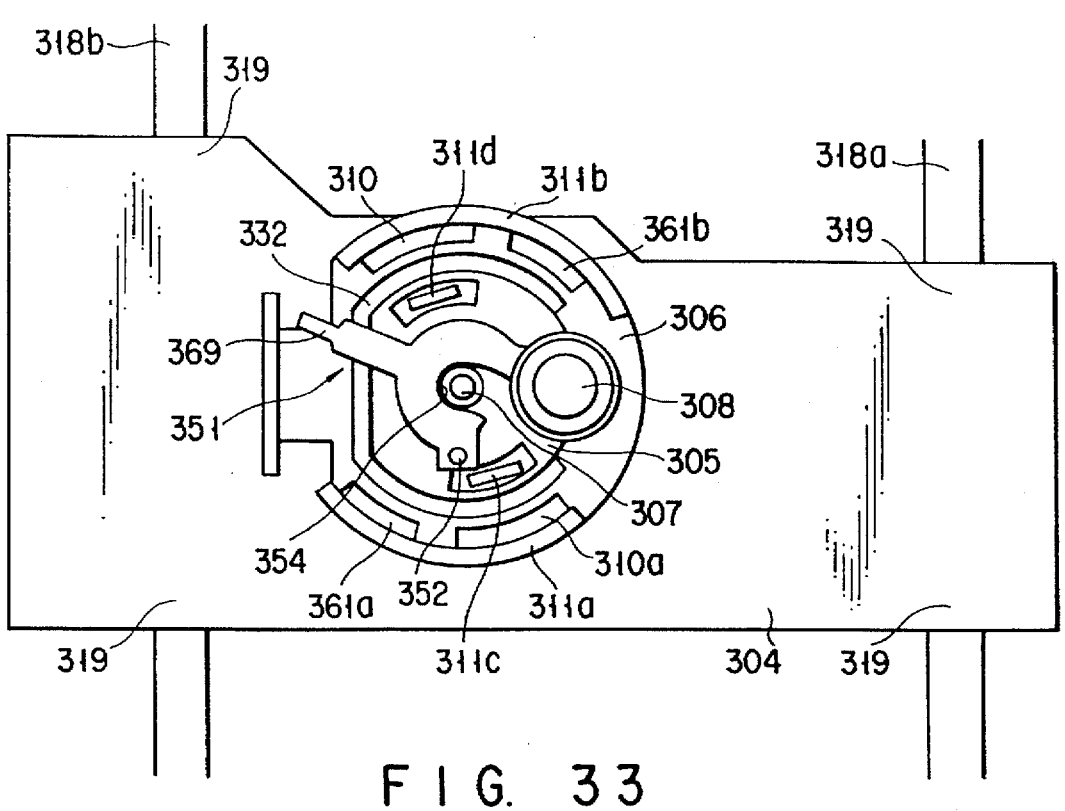
FIG. 33 is a plan view for showing the structure of the objective lens drive apparatus according to the tenth embodiment.

Next, the tenth embodiment of the present invention will be explained with reference to FIGS. 32 and 33. Here, FIG. 32 is a plan view showing the structure when the shutter of the objective lens drive apparatus according to the tenth embodiment is excluded. FIG. 33 is a plan view of the structure when the shutter of the objective lens drive apparatus according to the tenth embodiment is inserted. Note that those components which are the same as those of the ninth embodiment described above are denoted by the same references, to omit reiteration of explanation.

This embodiment is different from the ninth embodiment in the shape of the shutter 351. As shown in FIGS. 32 and 33, the lens holder 305 is provided with a shutter 351 having a smaller numerical aperture (e.g., 0.3) than the first diaphragm portion 305d, and is rotatably installed around the rotation bearing 352 as the center which is engaged with a shaft on the lens holder 305 positioned apart from the slide bearing 305c.

Further, this shutter 351 is rotated around the rotation bearing portion 352, and is inserted into inside a notch 305e between the lens attaching portion 305a and the first diaphragm portion 305d. Therefore, the second diaphragm portion 350 can be inserted into or excluded from the light path 341 of the objective lens 308.

In addition, a notch 354 is formed in the vicinity of the center of the shutter 351 in order to avoid collision between the shutter 351 and the slide bearing 305c. The state shown in FIG. 33 is of where the second diaphragm portion 350 is just inserted in the light path 341 of the objective lens 308.

Note that the shutter 351 is made of a nonmagnetic spring material such as phosphor bronze, engineer plastic, SUS, or the like, like in the ninth embodiment described above.

According to the objective lens drive apparatus, not only the same advantages as obtained in the ninth embodiment. Besides, the second diaphragm portion 350 avoids interferences with the permanent magnets 310b and 361b when the second diaphragm portion 350 is inserted and/or excluded, since the center of rotation is dislocated. This results in an excellent practical advantage in that magnetic flux inside the magnetic circuits is not changed and a state of high driving sensitivity can be maintained.

In the ninth and tenth embodiments as described above, although engagement between the rack and the pinion is used as a means for moving the shutter, it is possible to arrange the structure such that a well-known solenoid and a cam mechanism are used to move the shutter, for example.

It is possible that a plurality of objective lenses having different optical characteristics are fixed at both ends of the lens holder 305 with the rotation shaft 307 situated as the center and that diaphragm portions are respectively provided for these objective lenses. In this structure, an objective lens having less spherical aberration can be selected in accordance with the thickness of the disc substrate, at first, and a diaphragm portion can then be selected in accordance with the spot diameter to be formed on the disc. Therefore, it is possible to provide an objective lens drive apparatus by which recording and/or reproduction of information with respect to various kinds of optical discs and magneto-optical-magnetic discs of different standards can be performed by one single apparatus.

Further, although the above ninth and tenth embodiments show an objective lens drive apparatus which comprises two diaphragm portions, three or more diaphragm portions can be prepared if necessary. In this case, it is desirable that only the diaphragm portion having the largest opening is fixed while the other diaphragm portions are disposed in the order from the diaphragm having a larger numerical aperture.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

According to the embodiments described above, the diaphragm portions are provided in order to vary characteristic of the light beam and the characteristic is changed by shutting part of the light beam. However, it is possible to use a Fresnel lens for changing a direction of the light beam, a glass plate for partly passing the light beam, or the like, in order to obtain advantages in the present invention.

As has been described above, according to the present invention, it is possible to provide an objective lens drive apparatus which alone can perform recording or reproduction of information with respect to various optical information recording media according to different standards.

What is claimed is:

1. An objective lens drive apparatus comprising:
   a movable member which can be moved along a surface of an optical information recording medium;
   an objective lens fixed to the movable member, for allowing a light beam to pass and for concentrating the beam onto the optical information recording medium;
   a first diaphragm member fixed to the movable member, having a first aperture for determining a diameter of the light beam passing;
   a second diaphragm member having a second aperture for determining the diameter of the light beam passing;
   the first aperture being closer to the objective lens than the second aperture; and
   the first aperture being larger than the second aperture.

2. An objective lens drive apparatus according to claim 1, wherein:
   the second diaphragm member can be at least one of inserted in a light path of the light beam and excluded from the light path.

3. An objective lens drive apparatus according to claim 2, further comprising:
   a control circuit for performing at least one of inserting the second diaphragm member and excluding the second diaphragm member, such that a diameter of a spot corresponding to a kind of the optical information medium can be formed.

4. An objective lens drive apparatus according to claim 1, further comprising:
   a Fresnel lens for changing a direction of the light beam passing.

5. An objective lens drive apparatus comprising:
   a movable member which can be moved along a surface of an optical information recording medium;
   an objective lens fixed to the movable member, for allowing a light beam to pass and for concentrating the beam onto the optical information recording medium;
   a first diaphragm member fixed to the movable member, having a first aperture for determining a diameter of the light beam passing;
   a second diaphragm member provided such that the second diaphragm member can be at least one of excluded from a light path of the light beam and inserted into the light path, and having a second aperture for determining the diameter of the light beam passing;
   the first aperture being closer to the objective lens than the second aperture; and
   the first aperture being larger than the second aperture.

6. An objective lens drive apparatus according to claim 5, further comprising:
   a rotation shaft for rotatably and movably supporting the second diaphragm member when performing at least one of inserting the second diaphragm member and excluding the second diaphragm member.

7. An objective lens drive apparatus according to claim 6, wherein:
   the rotation shaft supports a portion of a center of gravity of the second diaphragm member.

8. An objective lens drive apparatus according to claim 5, wherein:
   the second aperture is formed in an elliptic shape which is shorter in a radial direction of the optical information recording medium.

9. An objective lens drive apparatus according to claim 5, further comprising:
   a control circuit for performing at least one of inserting the second diaphragm member and excluding the second diaphragm member, in accordance with a kind of the optical information recording medium.

10. An objective lens drive apparatus according to claim 5, wherein:
   the movable member is arranged such that the objective lens can be moved to a position outside an outermost periphery of a recording area of the optical information medium.

11. An objective lens drive apparatus according to claim 10, wherein:
   the second diaphragm member is arranged such that, when the objective lens is positioned outside the outermost periphery of the recording area of the optical information recording medium, the second diaphragm member can be at least one of inserted into the light path and excluded from the light path.

12. An objective lens drive apparatus according to claim 5, wherein the second diaphragm member comprises:
   a magnetic material which maintains the second diaphragm member inserted, by a magnetic attraction force, when the second diaphragm member is inserted in the light path.

13. An objective lens drive apparatus comprising:
   a movable member which can be moved along a surface of an optical information recording medium;
   an objective lens fixed to the movable member, for allowing a light beam to pass and for concentrating the beam onto the optical information recording medium;
   a first diaphragm member fixed to the movable member, having a first aperture for determining a diameter of the light beam passing; and
   a second diaphragm member which moves together with the movable member and has a second aperture which determines the diameter of light beam passing, said second diaphragm member being provided at a position relative to the movable member which changes when the second diaphragm member is brought into contact with another member while the movable member is moving, thereby to realize at least one of exclusion from a light path of the light beam and insertion into the light path of the light beam;
   the first aperture being closer to the objective lens than the second aperture; and
   the first aperture being larger than the second aperture.

14. An objective lens drive apparatus according to claim 13, wherein:
   a static friction force is effected between the second diaphragm member and the movable member.

15. An objective lens drive apparatus according to claim 13, further comprising:
   a projecting member for restricting a movement range when the movable member is moved.

16. An objective lens drive apparatus according to claim 13, further comprising:
   a rotation shaft for rotatably and movably supporting the second diaphragm member when performing at least one of excluding the second diaphragm member and inserting the second diaphragm member.

17. An objective lens drive apparatus according to claim 16, wherein:
   the rotation shaft supports a portion of a center of gravity of the second diaphragm member.

18. An objective lens drive apparatus according to claim 13, further comprising:
   a control circuit for performing at least one of inserting the second diaphragm member and excluding the second diaphragm member, in accordance with a kind of the optical information recording medium.

19. An objective lens drive apparatus according to claim 13, further comprising:
   a subsidiary coil for adjusting a position of the movable member by a Lorentz force after the second diaphragm member is at least one of inserted and excluded.

20. An objective lens drive apparatus according to claim 13, wherein:
   the second diaphragm member is provided in a side opposite to the optical information recording medium with the objective lens interposed therebetween.

21. An objective lens drive apparatus according to claim 13, wherein:
   the second diaphragm member is enclosed in the movable member.

22. An objective lens drive apparatus according to claim 21, further comprising:
   elastic protect means for coating a part of the second diaphragm member.

23. An objective lens drive apparatus according to claim 22, wherein:
   the elastic protect means is made of a rubber film.

24. An objective lens drive apparatus comprising:
   a movable member which can be moved along a surface of an optical information recording medium;
   an objective lens fixed to the movable member, for allowing a light beam to pass and for concentrating the beam onto the optical information recording medium;
   a first diaphragm member fixed to the movable member and having a first aperture for determining a diameter of the light beam passing;
   a second diaphragm member provided such that the second diaphragm member can be at least one of excluded from a light path of the light beam and inserted into the light path, and having a second aperture for determining the diameter of the light beam passing;
   the first aperture being closer to the objective lens than the second aperture;
   the first aperture being larger than the second aperture; and
   an engaging member which is engaged with the second diaphragm member when the second diaphragm member is at least one of excluded and inserted.

25. An objective lens drive apparatus according to claim 24, wherein:
   the second diaphragm member is arranged such that, when the second diaphragm member is moved apart from the optical information recording medium to a predetermined position, the second diaphragm member can be at least one of excluded from the light path and inserted into the light path.

26. An objective lens drive apparatus according to claim 25, wherein:
   the movable member is arranged such that the objective lens can be moved to a position outside an outermost periphery of a recording area of the optical information recording medium.

27. An objective lens drive apparatus according to claim 26, wherein:

the engaging member is engaged with the second diaphragm member when the objective lens moves to a position outside the outermost periphery of the recording area of the optical information recording medium.

28. An objective lens drive apparatus according to claim 25, wherein:

the movable member is arranged such that the objective lens can be moved to a position inside an innermost periphery of a recording area of the optical information recording medium.

29. An objective lens drive apparatus according to claim 28, wherein:

the engaging member is engaged with the second diaphragm member when the objective lens moves to a position inside the innermost periphery of the recording area of the optical information recording medium.

30. An objective lens drive apparatus according to claim 24, further comprising:

a rotation shaft for rotatably and movably supporting the second diaphragm member when performing at least one of inserting the second diaphragm member and excluding the second diaphragm member.

31. An objective lens drive apparatus according to claim 30, wherein:

the rotation shaft supports a portion of a center of gravity of the second diaphragm member.

32. An objective lens drive apparatus comprising:

a movable member which can be moved along a surface of an optical information recording medium;

an objective lens fixed to the movable member, for allowing a light beam to pass and for concentrating the beam onto the optical information recording medium;

a first diaphragm member fixed to the movable member, positionally unchangeable relative to the objective lens, and having a first aperture for determining a diameter of the light beam passing; and a second diaphragm member provided such that the second diaphragm member can be at least one of excluded from a light path of the light beam and inserted into the light path, and having a second aperture for determining the diameter of the light beam passing, wherein the first diaphragm is placed between the objective lens and the second diaphragm member when the second diaphragm member is inserted into the light path.

33. An objective lens drive apparatus comprising:

a movable member which can be moved along a surface of an optical information recording medium;

an objective lens fixed to the movable member, for allowing a light beam to pass and for concentrating the beam onto the optical information recording medium;

a first diaphragm member fixed to the movable member, positionally unchangeable relative to the objective lens, and having a first aperture for determining a diameter of the light beam passing; and a second diaphragm member provided such that the second diaphragm member can be at least one of excluded from a light path of the light beam and inserted into the light path, and having a second aperture for determining the diameter of the light beam passing, wherein the objective lens is placed between the first diaphragm member and the second diaphragm member when the second diaphragm member is inserted into the light path.

* * * * *